US012362456B2

(12) United States Patent
Caratelli et al.

(10) Patent No.: US 12,362,456 B2
(45) Date of Patent: *Jul. 15, 2025

(54) MIMO ANTENNA SYSTEM, WIRELESS DEVICE, AND WIRELESS COMMUNICATION SYSTEM

(71) Applicant: The Antenna Company International N.V., Willemstad (CW)

(72) Inventors: Diego Caratelli, Eersel (NL); Avraam Loutridis, Eindhoven (NL); János Sófalvi, Eindhoven (NL)

(73) Assignee: THE ANTENNA COMPANY INTERNATIONAL N.V., Willemstad (CW)

( * ) Notice: Subject to any disclaimer, the term of this patent is extended or adjusted under 35 U.S.C. 154(b) by 38 days.

This patent is subject to a terminal disclaimer.

(21) Appl. No.: 18/226,384

(22) Filed: Jul. 26, 2023

(65) Prior Publication Data

US 2023/0369744 A1 Nov. 16, 2023

Related U.S. Application Data

(63) Continuation of application No. 16/825,082, filed on Mar. 20, 2020, now Pat. No. 11,757,171.

(30) Foreign Application Priority Data

Mar. 22, 2019 (NL) ...................................... 2022792

(51) Int. Cl.
*H01Q 1/22* (2006.01)
*H01Q 1/48* (2006.01)
(Continued)

(52) U.S. Cl.
CPC ............. *H01Q 1/2291* (2013.01); *H01Q 1/48* (2013.01); *H01Q 5/371* (2015.01); *H01Q 5/378* (2015.01);
(Continued)

(58) Field of Classification Search
CPC ........ H01Q 1/2291; H01Q 1/48; H01Q 5/371; H01Q 5/378; H01Q 5/48; H01Q 5/50; H01Q 5/42; H01Q 21/28; H04B 7/0413
See application file for complete search history.

(56) References Cited

U.S. PATENT DOCUMENTS 9,673,536 B2 * 6/2017 Ng ........................... H01Q 9/28
2007/0229364 A1 10/2007 Shor
(Continued)

OTHER PUBLICATIONS

Written Opinion and Search Report dated Jun. 1, 2019 corresponding to Dutch application No. 2022792.

*Primary Examiner* — Dameon E Levi
*Assistant Examiner* — Michael M Bouizza
(74) *Attorney, Agent, or Firm* — Nath, Goldberg & Meyer; Joshua B. Goldberg

(57) ABSTRACT

The invention relates to a MIMO antenna system for IEEE 802.11 WiFi communication. The invention also relates to a wireless device, such as a wireless access point (AP), a router, a gateway, and/or a bridge, comprising at least one antenna system according to the invention. The invention further relates to a wireless communication system, comprising a plurality of antenna systems according to the invention, and, preferably, a plurality of wireless devices according to the invention.

23 Claims, 30 Drawing Sheets

(51) Int. Cl.
   *H01Q 5/371*   (2015.01)
   *H01Q 5/378*   (2015.01)
   *H01Q 5/48*    (2015.01)
   *H01Q 5/50*    (2015.01)
   *H04B 7/0413*  (2017.01)

(52) U.S. Cl.
   CPC ............... *H01Q 5/48* (2015.01); *H01Q 5/50* (2015.01); *H04B 7/0413* (2013.01)

(56) References Cited

U.S. PATENT DOCUMENTS

| | | |
|---|---|---|
| 2011/0216492 A1 | 9/2011 | Murakata |
| 2011/0241953 A1 | 10/2011 | Su |
| 2014/0139393 A1 | 5/2014 | Yoon et al. |
| 2014/0313093 A1 | 10/2014 | Smith et al. |
| 2016/0064808 A1* | 3/2016 | Khidre ............... H01Q 9/42 |
| | | 343/893 |
| 2016/0064830 A1 | 3/2016 | Jervis et al. |
| 2016/0105228 A1 | 4/2016 | Cook |
| 2017/0250462 A1 | 8/2017 | Li |
| 2017/0317428 A1 | 11/2017 | Petropoulos |

\* cited by examiner

Figure 10D:
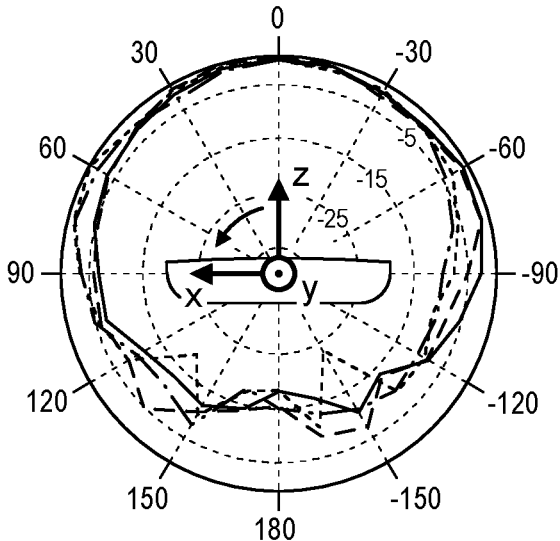
Figure 10E:
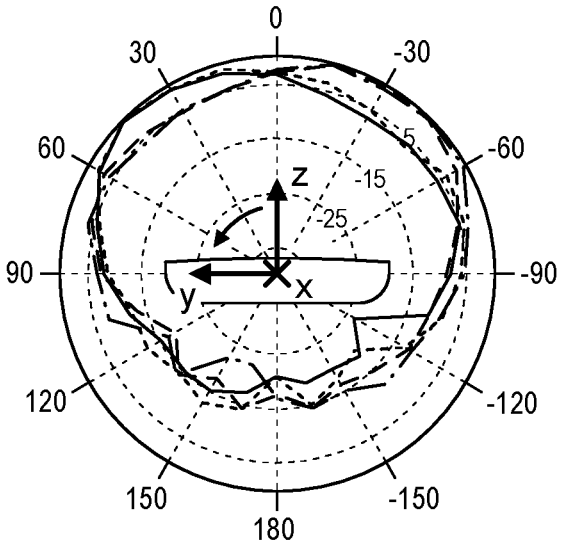
Figure 10F:
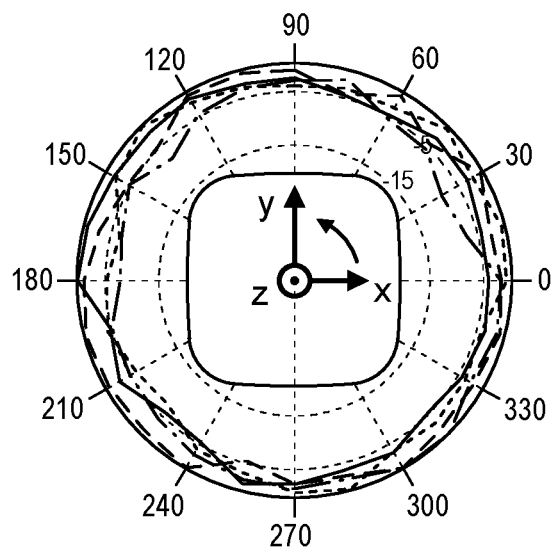
Figure 11A:
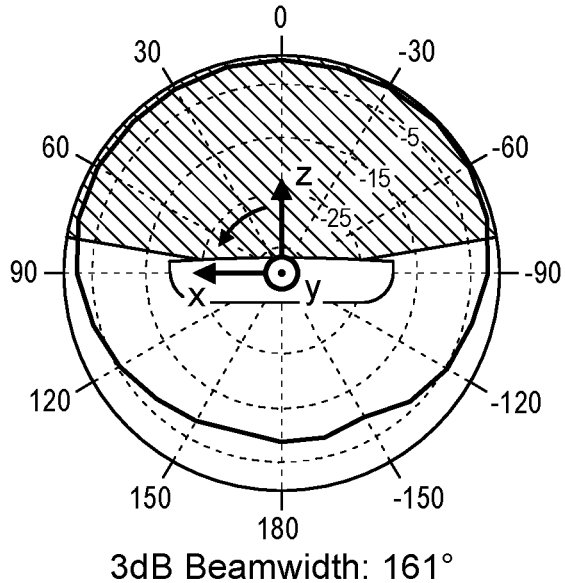
Figure 11B:
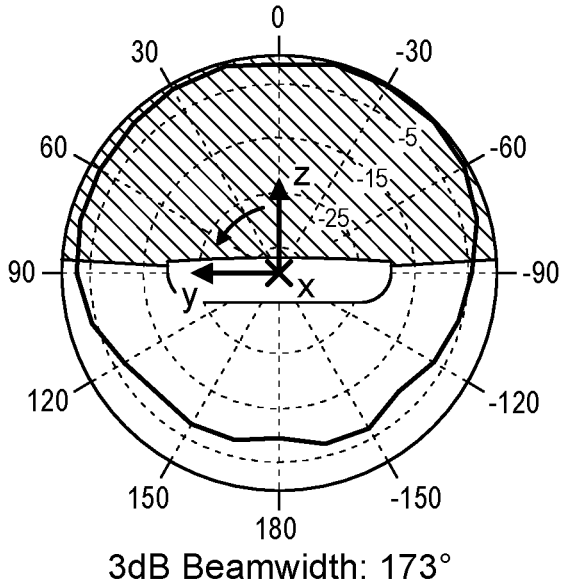
Figure 11C:
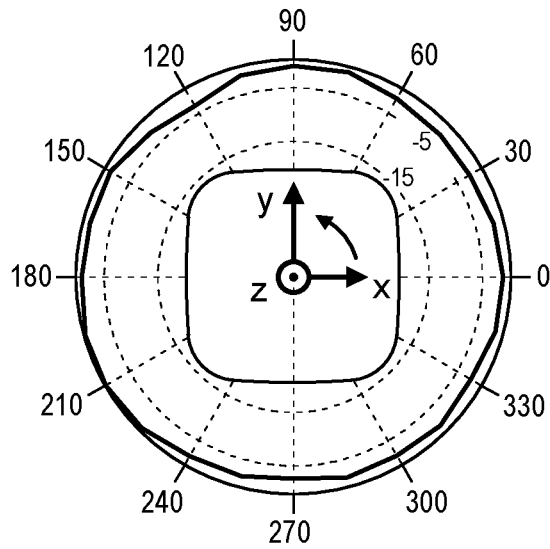
Figure 11D:
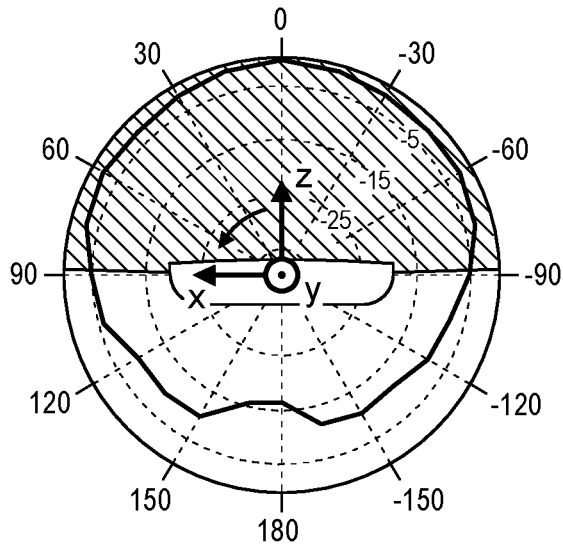
Figure 11E:
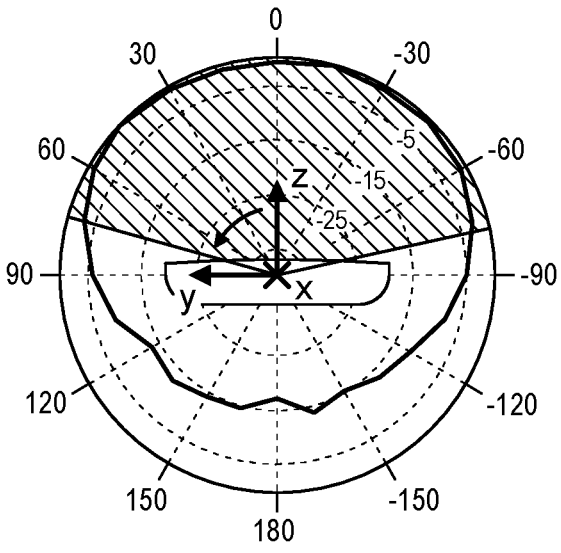
Figure 11F:
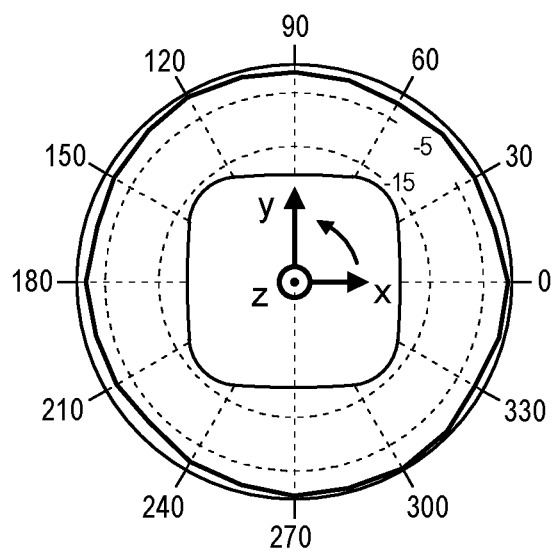

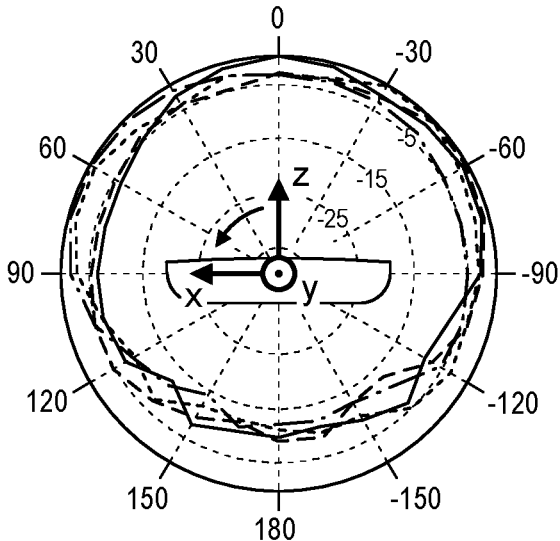
Fig. 10a
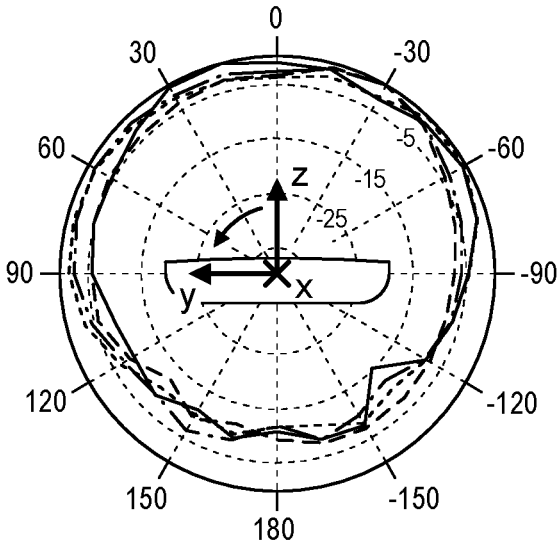
Fig. 10b
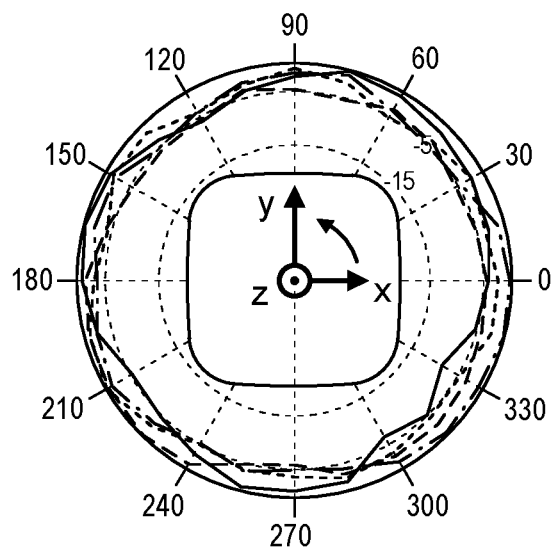
Fig. 10c
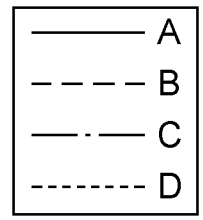

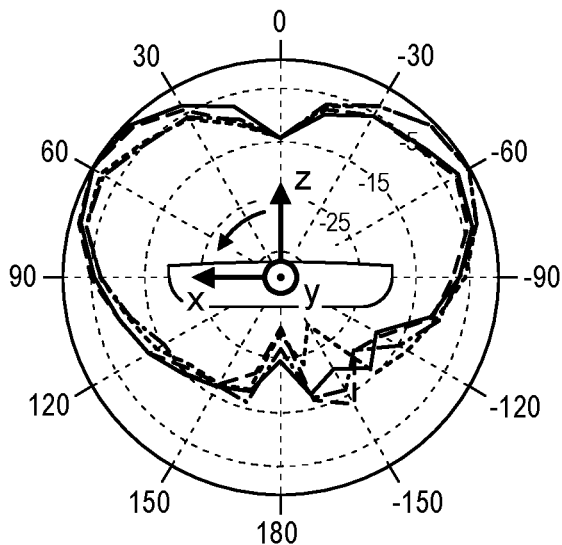
Fig. 16a
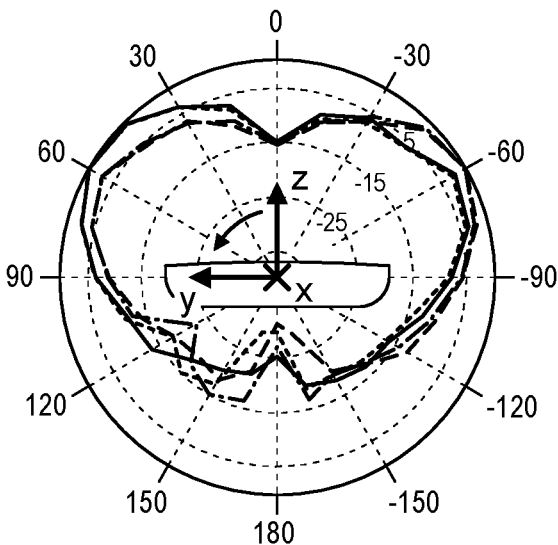
Fig. 16b
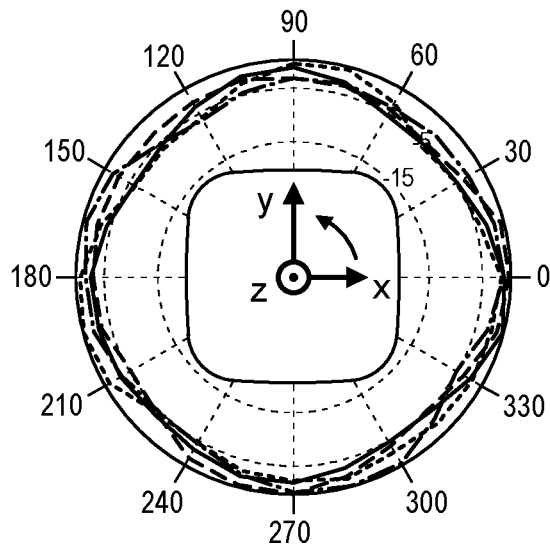
Fig. 16c
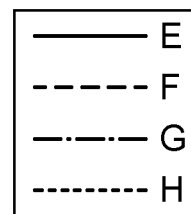

Frequency = 5.5 GHz  Phi = 0°

3dB Beamwidth:
50° in both directions

Frequency = 5.5 GHz  Phi = 90°

3dB Beamwidth:
50° in both directions

Frequency = 5.5 GHz  Theta = 90°

MIMO ANTENNA SYSTEM, WIRELESS DEVICE, AND WIRELESS COMMUNICATION SYSTEM

This is a Continuation Application of U.S. patent application Ser. No. 16/825,082, filed Mar. 20, 2020, an application claiming the benefit from Netherlands Application No. 2022792, filed Mar. 19, 2019, and from Great Britain Application No. 20190100143, filed Mar. 22, 2019, the contents of each of which are hereby incorporated by reference in their entirety.

The invention relates to a MIMO antenna system for IEEE 802.11 WiFi communication. The invention also relates to a wireless device, such as a wireless access point (AP), a router, a gateway, and/or a bridge, comprising at least one antenna system according to the invention. The invention further relates to a wireless communication system, comprising a plurality of antenna systems according to the invention, and, preferably, a plurality of wireless devices according to the invention.

802.11b standard uses frequencies between 2.4 GHz and 2.495 GHz of the electromagnetic spectrum (the "2.4 GHz band") and allows users to transfer data at speeds up to 11 Mbit/sec. The IEEE 802.11a standard extends the IEEE 802.11b standard to frequencies between 5.15 GHz and 5.875 GHz (the "5 GHz band") and allows data to be exchanged at even faster rates (up to 54 Mbit/sec), but at a shorter operating range than does IEEE 802.11b. And the IEEE 802.11g standard is an extension to IEEE 802.11b. IEEE 802.11g still uses the 2.4 GHz band, but broadens IEEE 802.11b system data rates to 54 Mbps by using OFDM (orthogonal frequency division multiplexing) technology.

IEEE 802.11ax, which is on the horizon, and which is also known as High-Efficiency Wireless (HEW), is a Wireless Local Area Network standard in the IEEE 802.11 set of specifications. The wireless network technology is also labelled as Wi-Fi 6 by Wi-Fi Alliance. IEEE 802.11ax is designed to operate in the already existing 2.4 GHz and 5 GHz spectrums and it will incorporate additional bands between 1 and 7 GHz as they become available. IEEE 802.11ax lets access points support more clients in dense environments and provide a better experience for typical wireless LAN networks. It also powers more predictable performance for advanced applications such as 4K video, Ultra HD, wireless office, and Internet of Things (IoT). Flexible wake-up time scheduling lets client devices sleep much longer than with IEEE 802.11ac, and wake up to less contention, extending the battery life of smart phones, IoT, and other devices. Although conventional dual-band Wi-Fi antennas are suitable—to some extent—for IEEE 802.11ax applications, a more careful and detailed antenna design is needed since the system throughput, the radio coverage, and return loss of the conventional Wi-Fi antenna is relatively poor. Moreover, in order to enable simultaneous transmit and receive operation in next-generation IEEE 802.11ax WLANs, dedicated antenna solutions are needed that feature extremely reduced level of parasitic electromagnetic coupling between different antenna pairs in combination with high efficiency and return loss characteristics, as well as low-gain properties and uniformity of radio coverage.

It is an object of the invention to provide an improved antenna system which is more suitable for IEEE 802.11ax Wi-Fi applications.

The aforementioned object can be achieved by providing a MIMO antenna system according to the preamble, comprising: a conductive ground plane, a first MIMO pair of vertically polarized first antennas, mounted onto a top surface of said ground plane, and configured to operate in the 5 GHz frequency band and/or the 2.4 GHz frequency band, and a second MIMO pair of horizontally polarized second antennas mounted on the top surface of said ground plane, and configured to operate in the 5 GHz frequency band and/or the 2.4 GHz frequency band, a plurality of the first feeding cables, wherein each first feeding cable is connected to a first antenna, a plurality of the second feeding cables, wherein each second feeding cable is connected to a second antenna, wherein the top surface of the ground plane is provided with a plurality of cable channels, wherein each cable channel is configured to accommodate at least a part of at least one feeding cable, and wherein each cable channel extends from an antenna to a cable feed-through opening applied in the ground plane. The application of cable channels (grooves) in the ground plane allow the feeding cables to be accommodated at least partially within the ground plane. During operation, feeding cables will typically cause undesired parasitic radiation, which could lead to undesired cross-talk between antennas, and which could seriously affect the antenna system performance. This negative effect will become greater in case more cables are used, and in case of a MIMO antenna system typically a considerable number of a cables is used to connect all antennas. By housing the feeding cables at least partially within the conductive ground plane, this undesired side effect could be reduced significantly, and could even be eliminated completely, which is in great favour of the antenna isolation, and which significantly improves the performance of the antenna system according to the invention. Hence, with the antenna system according to the invention an extremely high antenna isolation can be achieved without compromising uniformity of radiation and efficiency. The antenna system performance is further improved by applying a combination of differently polarized (horizontally and vertically polarized) antennas for enabling best isolation between separate MIMO pairs. The high-performance MIMO antenna system allows an architecture with tri-band capability and >43 dB cross-pair isolation for supporting Rx desensitization levels, in combination to reduced <8 dB gain ripple characteristics for enhanced uniformity of radiation and TPUT without blind spots.

Preferably, cable channels comprise: a plurality of first cable channels, wherein each first cable channel is provided with at least a part of at least one first feeding cable, and a plurality of second cable channels, wherein each second cable channel is provided with at least a part of at least one second feeding cable. Preferably, at least two, and preferably all, first cable channels extend to a first cable feed-through opening applied in the ground plane. Preferably, at least two, and preferably all, second cable channels extend to a second cable feed-through opening applied in the ground plane. The first cable feed-through opening and the second feed-through opening may be the same feed-through opening. However, in practice the first cable feed-through opening and the second cable feed-through opening are positioned at a distance from each other. The first and/or second cable feed-through opening may be fully enclosed (surrounded) by the ground plane material. However, it is also conceivable that the first and/or second cable feed-through opening are positioned at a peripheral edge of the ground plane, wherein the first and/or second cable feed-through may be formed by a cut-away portion of the ground plane.

The depth of at least one cable channel is preferably substantially equal to or exceeds the diameter of the feeding cable accommodated within said cable channel. This allows (segments of) the feeding cable(s) to be accommodated completely within a space enclosed and/or defined by the ground plane. Preferably, at least one cable channel is at least partially curved. By using a curved channel, the use of perpendicular channel segments, which could damage the feeding cable(s), may be prevented.

It is preferable in case at least one feeding cable is locked in place within a cable channel. This means that the feeding cable is locked and/or fixed and/or secured and/or clamped within the channel to prevent undesired loosening (disconnection) of the feeding cable from the channel. This locking in place of at least one feeding cable within a cable channel can be realized by the cable channel itself. This may e.g. be realized by applying a channel opening which is (slightly) narrower than the feeding cable diameter. Alternatively and/or additionally, at least one feeding cable may be locked in place within a cable channel by using at least one adhesive strip (tape) covering the cable channel at least partially. At least one terminal portion of at least one cable channel facing at least one antenna is preferably widened to allow the feeding cable to be manoeuvred in an improved manner to facilitate connection of the feeding cable with the antenna. Preferably, each feeding cable is formed by a coax cable (coaxial cable), for example with a typical diameter of about 0.81 mm.

Typically a, or each, cable channel is configured to accommodate at least a part of an individual feeding cable, or part thereof. The accommodation of multiple feeding cables in a single cable channel may negatively affect the antenna signals.

Preferably, at least one cable channel provides a substantially linear path from a first or second antenna towards a respectively first or second cable feed-through opening. Such embodiment is beneficial as it enables the use of a relatively short cable. The longer the cable, the more losses in signal may occur.

In a preferred embodiment, the first MIMO pair encloses the second MIMO pair. This means that the surface defined by the first MIMO pair enclosed the antennas of the second MIMO pair. Such embodiment may provide further improved isolation between said MIMO pairs. Typically, the antennas of the first MIMO pair are located at opposing edges of the ground plane and/or located in a peripheral zone of the ground plane, while the antennas of the second MIMO pair are positioned in a central zone of the ground plane. The antennas of the first MIMO pair may for example be located substantially at the circumference of the ground plane. It is conceivable that the first antennas are distributed along a peripheral zone of the ground plane. Hence, such embodiment substantially differs from an interleaved antenna arrangement. The antennas of the second MIMO pair are preferably substantially grouped at a central zone of the ground plane. Preferably, at least two adjacent first antennas are positioned in the line of sight with each other.

Preferably, at least two adjacent second antennas are positioned in the line of sight with each other. The distance in between a first antenna and an adjacent second antenna preferably exceeds the distance between adjacent second antennas.

Hence, the second antennas are preferably located relatively close to each other while the first antennas are preferably located more distant from each other. In a preferred embodiment, the antennas of the first MIMO pair together define a first simple polygon, and the antennas of the second MIMO pair together define a second simple polygon. A plane region or surface area defined by said first simple polygon is typically larger than a plane region or surface area defined by said second simple polygon. Preferably, the second simple polygon is situated entirely within the (border of the) second polygon, more preferably without any intersecting or coinciding borders. This will result into an uninterleaved (disentangled or unweaved), grouped MIMO pair configuration rather than into a typically undesired interleaved configuration of MIMO pairs, which reduces the coupling between the MIMO pairs which allow to the first MIMO pair of vertically polarized first antennas, and the second MIMO pair of horizontally polarized second antennas to operate a rather unhindered manner, which increases the overall antenna system performance.

Preferably, the first MIMO pair comprises at least four first antennas. Preferably, the second MIMO pair comprises at least four second antennas. Preferably, the first antennas are configured to operate both in the 5 GHz frequency band and the 2.4 GHz frequency band. Preferably, the second antennas are configured to operate solely in the 5 GHz frequency band.

In a preferred embodiment, the antenna system comprises at least one auxiliary vertically polarized dual-band antenna mounted onto the ground plane. This auxiliary antenna is preferably configured to operate both in the 5 GHz frequency band and the 2.4 GHz frequency band.

In a preferred embodiment, the antenna system comprises at least one auxiliary vertically polarized single-band antenna mounted onto the ground plane. This single-band antenna is preferably configured to operate within the 2.4 GHz frequency band. Preferably, this single-band antenna is configured as Bluetooth antenna.

The antenna system preferably comprises a printed circuit board (PCB) mounted to a bottom surface of the ground plane. Typically, an electronic circuit, including an antenna system controller (control unit), is mounted onto the PCB. Preferably, the antenna system comprises at least one heat transmission element, such as a heat pipe and/or a heat sink, mounted onto said bottom surface of the ground plane and configured to disperse heat generated by the printed circuit board (PCB). This heat may be dispersed partially from the heat transmission element(s) to the ground plane and/or the surrounding atmosphere.

In a preferred embodiment, the ground plane is provided with one or more cavities, in particular one or more circular cavities, wherein each cavity is positioned underneath (a substrate of) a second antenna, and wherein each cavity is configured to enlarge the effective distance between the second antenna and the ground plane. This feature allows a more compact design of the antenna system according to the invention.

Preferably, the antenna system comprises at least one parasitic element, preferably formed by a metallic pin and/or a diffraction hole, mounted onto or in the top surface of the ground plane and positioned in between a first antenna and an adjacent second antenna. The application of parasitic elements results in the diffraction of the electromagnetic power radiated by the various antenna elements and, in this way, enhances the uniformity of radio coverage. Preferably, the antenna system comprises a plurality of parasitic elements mounted onto the top surface of the ground plane, wherein in between each first antenna and each adjacent second antenna at least one parasitic element, preferably formed by a metallic pin and/or a diffraction hole, is positioned.

Typically, the parasitic elements are made of a conductive material, in particular metal. Preferably the parasitic elements are made of the same material as the ground plane, and more preferably, the parasitic elements and the ground plane are integrated and/or made out of one piece of material (metal). The ground plane, including the cable channels, the cavities (if applied), and the parasitic elements (if applied), can be all be made out of the same material (typically metal), and may be made in e.g. by diecasting. Suitable materials for the ground plane and the parasitic elements are, for example, stainless steel or aluminium.

It is conceivable that at least one additional MIMO pair of antennas is mounted onto the top surface of said ground plane. Dependent on the application, the antennas could either be single-band, dual-band, of triple-band antenna.

In a preferred embodiment of the antenna system according to the invention, each second antenna comprises: a substantially flat, dielectric substrate, a conductive central feeding point, at least three folded dipole elements applied onto an upper side of said substrate, each folded dipole element comprising: a loop-shaped first conductor including a first curved inner conductor part and a first curved outer conductor part, wherein outer ends of the first inner conductor part are connected to respective outer ends of the first outer conductor part, and a first conductive dipole branch and a conductive second dipole branch, both dipole branches being connected, respectively, to different segments of said first inner conductor part, wherein both dipole branches are also connected to said central feeding point, wherein the conductors of the folded dipole elements are arranged in a substantially circular arrangement. Advantages of further embodiments of this specific second antenna are described extensively in the co-pending patent application NL2022790, the content of which is incorporated in this document by reference.

The invention also relates to a wireless device, such as a wireless access points (AP), a router, a gateway, and/or a bridge, comprising at least one antenna system according to the invention.

The invention further relates to a wireless communication system, comprising a plurality of antennas systems according to the invention, and, preferably, a plurality of wireless devices according to the invention.

Non-limitative embodiments of the invention are described in the below set of clauses:

1. Multiple-Input, Multiple-Output ("MIMO") antenna system for IEEE 802.11 WiFi communication, comprising:
    a conductive ground plane,
    a first MIMO pair of vertically polarized first antennas, mounted onto a top surface of said ground plane, and configured to operate in the 5 GHz frequency band and/or the 2.4 GHz frequency band, and
    a second MIMO pair of horizontally polarized second antennas mounted on the top surface of said ground plane, and configured to operate in the 5 GHz frequency band and/or the 2.4 GHz frequency band,
    a plurality of the first feeding cables, wherein each first feeding cable is connected to a first antenna,
    a plurality of the second feeding cables, wherein each second feeding cable is connected to a second antenna,
wherein the top surface of the ground plane is provided with a plurality of cable channels, wherein each cable channel is configured to accommodate at least a part of at least one feeding cable, and wherein each cable channel extends from an antenna to a cable feed-through opening applied in the ground plane.

2. Antenna system according to clause 1, wherein the cable channels comprise:
    a plurality of first cable channels, wherein each first cable channel is provided with at least a part of at least one first feeding cable, and
    a plurality of second cable channels, wherein each second cable channel is provided with at least a part of at least one second feeding cable.

3. Antenna system according to clause 2, wherein at least two, and preferably all, first cable channels extend to a first cable feed-through opening applied in the ground plane.

4. Antenna system according to clause 2 or 3, wherein at least two, and preferably all, second cable channels extend to a second cable feed-through opening applied in the ground plane.

5. Antenna system according to clause 3 and 4, wherein the first cable feed-through opening and the second cable feed-through opening are positioned at a distance from each other.

6. Antenna system according to one of the foregoing clauses, wherein the depth of at least one cable channel is substantially equal to or exceeds the diameter of the feeding cable accommodated within said cable channel.

7. Antenna system according to one of the foregoing clauses, wherein at least one cable channel is at least partially curved.

8. Antenna system according to one of the foregoing clauses, wherein at least one feeding cable is locked in place within a cable channel.

9. Antenna system according to clause 8, wherein at least one feeding cable is locked in place within a cable channel by the cable channel itself.

10. Antenna system according to clause 8 or 9, wherein at least one feeding cable is locked in place within a cable channel by using at least one adhesive strip covering the cable channel at least partially.

11. Antenna system according to one of the foregoing clauses, wherein each feeding cable is formed by a coax cable.

12. Antenna system according to one of the foregoing clauses, wherein the first MIMO pair encloses the second MIMO pair.

13. Antenna system according to one of the foregoing clauses, wherein adjacent first antennas are positioned in the line of sight with each other.

14. Antenna system according to one of the foregoing clauses, wherein the distance in between a first antenna and an adjacent second antenna exceeds the distance between adjacent second antennas.

15. Antenna system according to one of the foregoing clauses, wherein the first MIMO pair comprises at least four first antennas.

16. Antenna system according to one of the foregoing clauses, wherein the second MIMO pair comprises at least four second antennas.

17. Antenna system according to one of the foregoing clauses, wherein the first antennas are configured to operate both in the 5 GHz frequency band and the 2.4 GHz frequency band.

18. Antenna system according to one of the foregoing clauses, wherein the second antennas are configured to operate solely in the 5 GHz frequency band.

19. Antenna system according to one of the foregoing clauses, wherein the antenna system comprises at least one auxiliary vertically polarized dual-band antenna mounted onto the ground plane.

20. Antenna system according to one of the foregoing clauses, wherein the antenna system comprises at least one auxiliary vertically polarized single-band antenna mounted onto the ground plane.

21. Antenna system according to one of the foregoing clauses, wherein the antenna system comprises a printed circuit board (PCB) mounted to a bottom surface of the ground plane.

22. Antenna system according to clause 21, wherein the antenna system comprises at least one heat transmission element, such as a heat pipe and/or a heat sink, mounted onto said bottom surface of the ground plane and configured to disperse heat generated by the printed circuit board (PCB).

23. Antenna system according to one of the foregoing clauses, wherein the ground plane is provided with cavities, in particular circular cavities, wherein each cavity is positioned underneath a second antenna, and wherein each cavity is configured to enlarge the effective distance between the second antenna and the ground plane.

24. Antenna system according to one of the foregoing clauses, wherein the antenna system comprises at least one parasitic element, preferably formed by a metallic pin, mounted onto the top surface of the ground plane and positioned in between a first antenna and an adjacent second antenna.

25. Antenna system according to one of the foregoing clauses, wherein the antenna system comprises a plurality of parasitic elements mounted onto the top surface of the ground plane, wherein in between each first antenna and each adjacent second antenna at least one parasitic element, preferably formed by a metallic pin, is positioned.

26. Antenna system according to one of the foregoing clauses, wherein at least one additional MIMO pair of antennas is mounted onto the top surface of said ground plane.

27. Antenna system according to one of the foregoing clauses, wherein the ground plane is made of metal, preferably stainless steel or aluminium.

28. Antenna system according to one of the foregoing clauses, wherein each second antenna comprises:
- a substantially flat, dielectric substrate,
- a conductive central feeding point,
- at least three folded dipole elements applied onto an upper side of said substrate, each folded dipole element comprising:
- a loop-shaped first conductor including a first curved inner conductor part and a first curved outer conductor part, wherein outer ends of the first inner conductor part are connected to respective outer ends of the first outer conductor part, and
- a first conductive dipole branch and a conductive second dipole branch, both dipole branches being connected, respectively, to different segments of said first inner conductor part, wherein both dipole branches are also connected to said central feeding point, wherein the conductors of the folded dipole elements are arranged in a substantially circular arrangement.

29. Wireless device, such as a wireless access points (AP), a router, a gateway, and/or a bridge, comprising at least one antenna system according to one of the foregoing clauses.

30. Wireless communication system, comprising a plurality of antennas systems according to one of clauses 1-28, and, preferably, a plurality of wireless devices according to clause 29.

The invention will be elucidated on the basis of non-limitative exemplary embodiments shown in the enclosed figures. In these embodiments, similar reference signs correspond to similar or equivalent features or elements.

Figure 1:
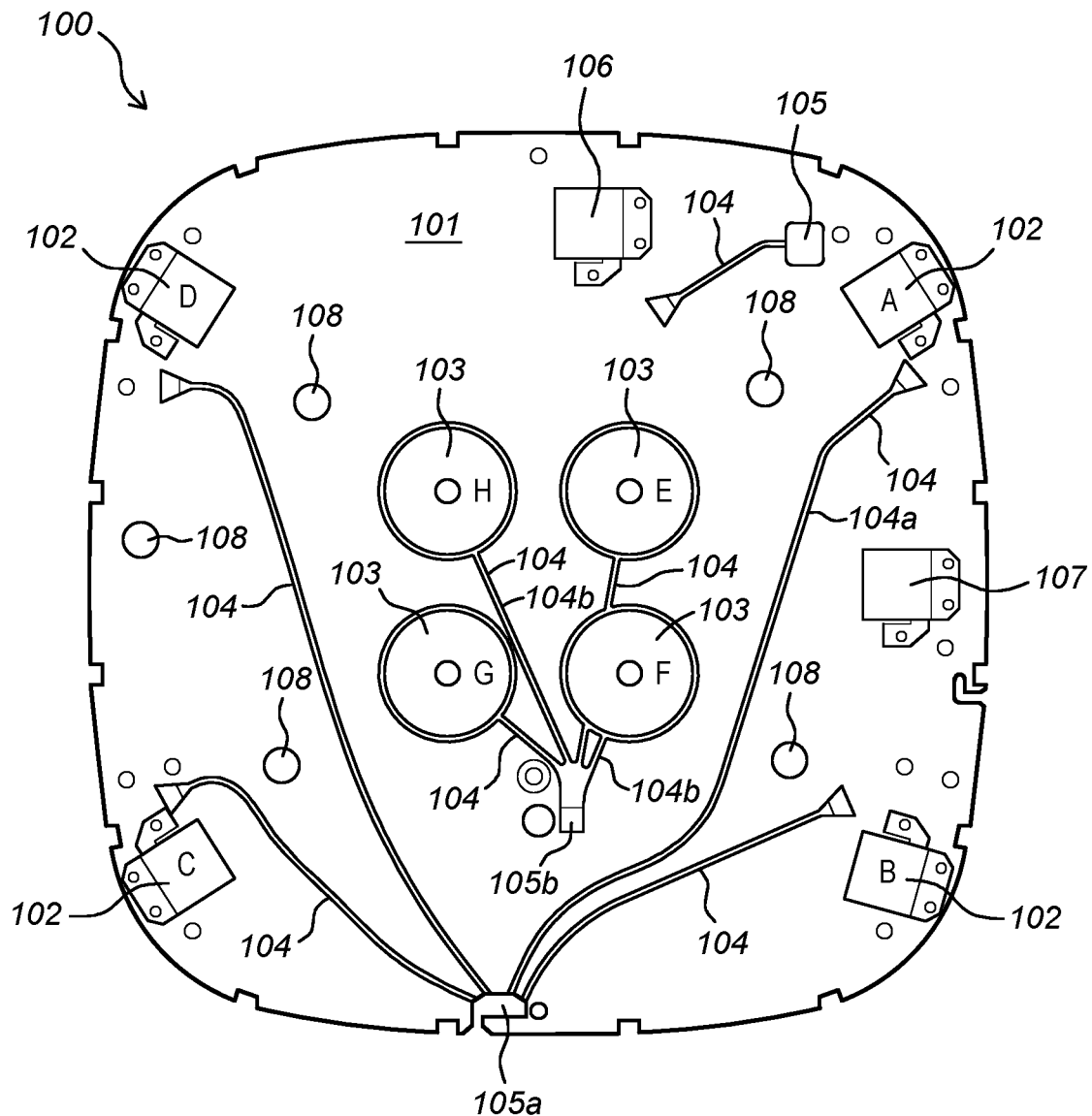

FIG. 1 shows a top view of a Multiple-Input, Multiple-Output ("MIMO") antenna system for IEEE 802.11 WiFi communication according to the present invention. The MIMO antenna system (100) comprises a conductive ground plane (101), a first MIMO pair of vertically polarized first antennas (102), mounted onto a top surface of said ground plane (101), and configured to operate in the 5 GHz frequency band and/or the 2.4 GHz frequency band, and a second MIMO pair of horizontally polarized second antennas (103) mounted on the top surface of said ground plane (101), and configured to operate in the 5 GHz frequency band and/or the 2.4 GHz frequency band. The first MIMO pair comprises in the shown embodiment four first antennas (102) and the second MIMO pair comprises four second antennas (103). In order to clarify the measurement results, the antennas all have a letter indication from A-F, which is useful for explanation of the experimental data of the further figures. The top surface of the ground plane (101) is provided with a plurality of cable channels (104), wherein each cable channel (104) is configured to accommodate at least a part of at least one feeding cable (not shown), and wherein each cable channel (104) extends from an antenna (102, 103) to a cable feed-through opening (105) applied in the ground plane (101). The MIMO antenna system (100) generally comprises a plurality of the first feeding cables, wherein each first feeding cable is connected to a first antenna (102) and a plurality of the second feeding cables, wherein each second feeding cable is connected to a second antenna (103). However, these feeding cables, which can for example be coax cables, are not shown in the figure in order to visualize the cable channel structure of the ground plane (101). The cable channels (104) in particular comprise a plurality of first cable channels (104a), wherein each first cable channel (104a) is configured to be provided with at least a part of at least one first feeding cable (not shown), and a plurality of second cable channels (104b), wherein each second cable channel (104b) is configured to be provided with at least a part of at least one second feeding cable (not shown). Hence, the depth of such cable channel (104a, 104b) is substantially equal to or exceeds the diameter of the feeding cable which is to be accommodated within said cable channel (104a, 104b). The first cable channels (104a) extend to a first cable feed-through opening (105a) applied in the ground plane (101). The second cable channels (104b) extend to a second cable feed-through opening (105b) applied in the ground plane (101). It can be seen that the first cable feed-through opening (105a) and the second cable feed-through opening (105b) are positioned at a distance from each other. In the shown embodiment are the first cable channels (104a) partially curved. The antenna system (100) further comprises an auxiliary vertically polarized dual-band antenna (106) and an auxiliary vertically polarized single-band antenna (107) mounted onto the ground plane (101). The antenna system (100) also comprises multiple parasitic elements (108) formed by metallic pins (108) which are mounted onto the top surface of the ground plane (101) and positioned in between a first antenna (102) and an adjacent second antenna (103) or an adjacent further first antenna (102).

Figure 2A:
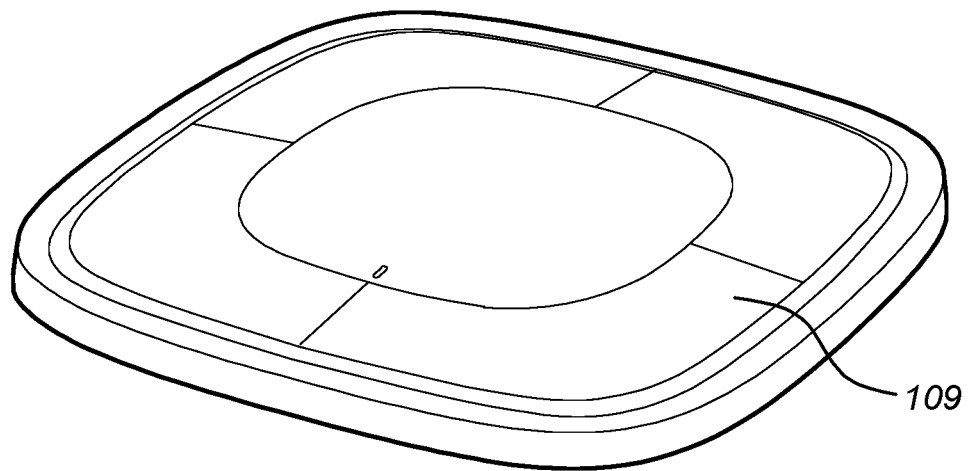
Figure 2B:
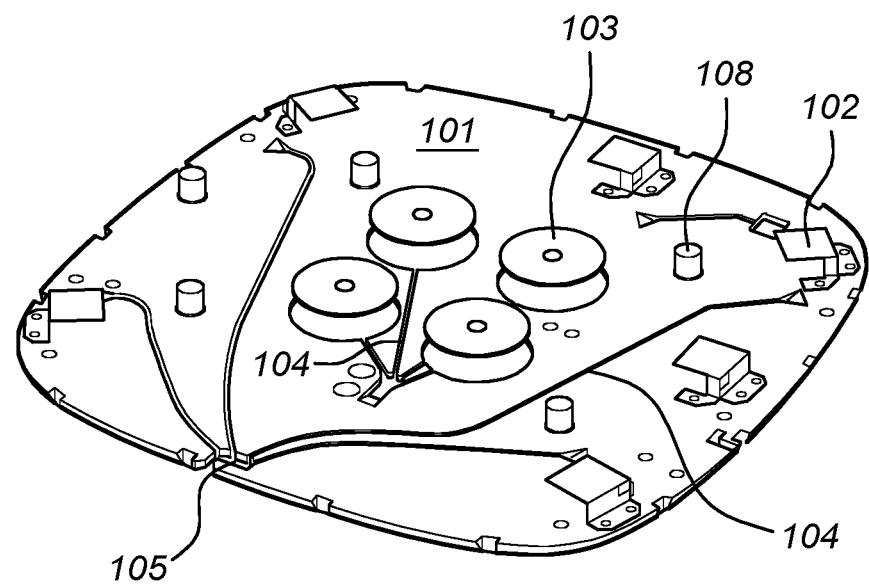

FIG. 2b shows a perspective view of the antenna system (100) as shown in FIG. 1. FIG. 2a shows an enclosure (109) configured to protect the antennas (102, 103, 106, 107) of the antenna system (100). The enclosure can also be referred to as radome (109). In the shown embodiment the radome (109) is made of molded plastic. Possible embodiments of the parasitic elements (108) are shown in FIG. 2b.

Figure 3A:
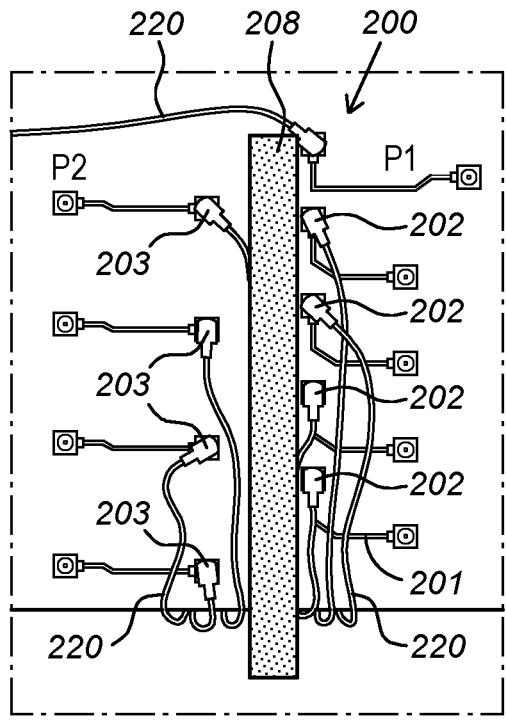
Figure 3B:
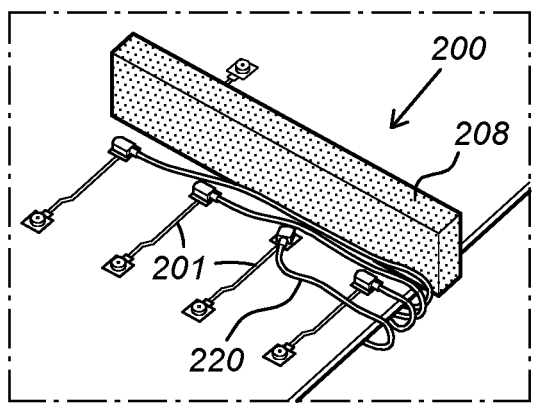
Figure 3C:
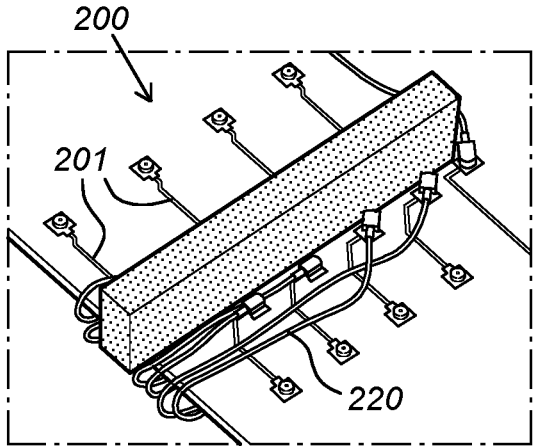

FIGS. 3a-3c show the printed circuit board (200) which is configured to be mounted to a bottom surface of the ground plane (101) of the antenna system (100) according to the present invention. The printed circuit board (200) comprises a first set of receptacles (202) used to connect the feeding coaxial cables (220) of the antenna elements included in MIMO pair P1 and a second set of receptacles (203) used to connect the feeding coaxial cables (220) of the antenna elements included in MIMO pair P2. The circuit board (200) is provided with a plurality of microstrip transmission lines (201). The circuit board (200) further comprises an isolating wall (208) present between the first set of receptacles (202) and the second set of receptacles (203). Furthermore, metal clips are soldered to the circuit board (200) in order to enable optimal routing of the feeding antenna coaxial cables.

Figure 4:
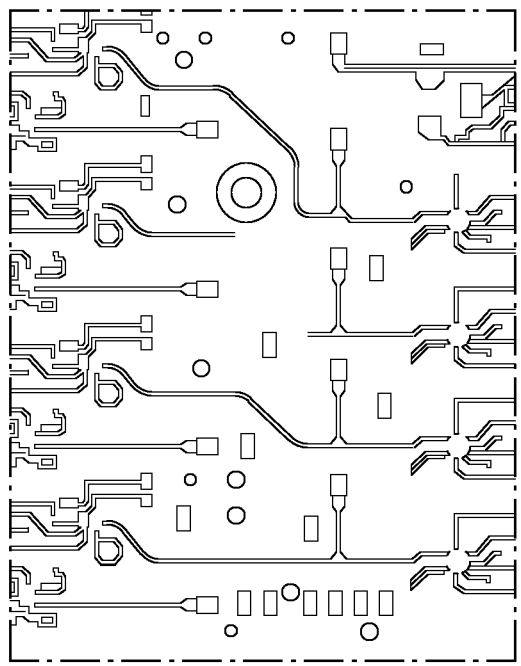

FIG. 4 shows the schematic of the printed circuit board (PCB) (200) which is configured to be mounted to a bottom surface of the ground plane (101) of the antenna system (100) according to the present invention.

Figure 5:
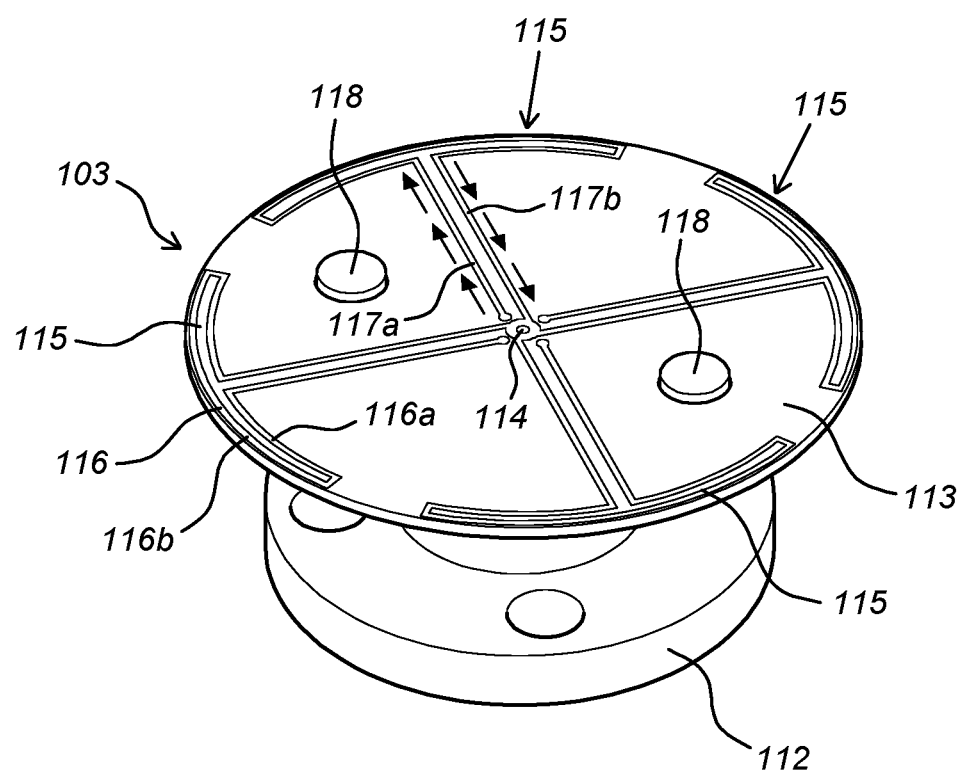

FIG. 5 shows a possible embodiment of a second antenna (103) for use in an antenna system according to the present invention. The antenna (103) is shown in combination with a dielectric mounting structure (112). The antenna (103) comprises a substantially flat, dielectric substrate (113), a conductive central feeding point (114) and four folded dipole elements (115) applied onto an upper side of said substrate (113). Each folded dipole element (115) comprises a loop-shaped first conductor (116) including a first curved inner conductor part (116*a*) and a first curved outer conductor part (116*b*), wherein outer ends of the first inner conductor part (116*a*) are connected to respective outer ends of the first outer conductor part (116*b*), and a first conductive dipole branch (117*a*) and a second conductive dipole branch (117*b*), both dipole branches being connected, respectively, to different segments of said first inner conductor part (116*a*), wherein both dipole branches (117*a*, 117*b*) are also connected to said central feeding point (114). The figure shows that the conductors (116) of the folded dipole elements (115) being arranged in a substantially circular arrangement. Hence, the second antenna (103) is configured to act as omnidirectional horizontal polarized antenna. The folded dipole elements (115) are positioned substantially on the outer perimeter of the dielectric substrate (113). Each folded dipole elements (115), and in particular the conductor parts (116) are positioned a predefined distance of an adjacent conductor part (116). The central feeding point (114) comprises an upper patch applied onto the upper side of the dielectric substrate, wherein the first dipole branches (117*a*) are connected to said upper patch, and wherein the central feeding point back comprises a lower patch applied onto the lower side of the dielectric substrate, wherein the second dipole branches (117*b*) are connected to said lower patch. It can be seen that the first inner conductor parts (116*a*) are positioned at a distance from the first outer conductor parts (116*b*). In the shown embodiment is the distance between said conductor parts (1016*a*, 116*b*) substantially equal to the distance between the dipole branches (117*a*, 117*b*). The first conductive dipole branch (117*a*), a first part of the first inner conductor part (116*a*), the first outer conductor part (116*b*), a second part of the first inner conductor part (116) and the second conductive dipole branch (117*b*) substantially form a loop from the central feeding point (114). The mounting structure (112) comprises contact elements (118) which are configured for engaging part of the antenna (103). The contact elements (118) are received within a through hole of the antenna (103). The arrows indicate the flow of current. Hence it can be seen that the first dipole branch (117*a*) and the second dipole branch (117*b*) are oriented and designed such that, during use, counter currents flowing through said dipole branches (117*a*, 117*b*) are at least partially cancelled out.

FIGS. 6*a*-11*f* are related to the first antennas A-D as shown in the previous figures. If a dotted line is indicated in the figure, the measured value should be below this threshold line. If an uninterrupted line is shown, the measured value should be above this threshold line.

Figure 6A:
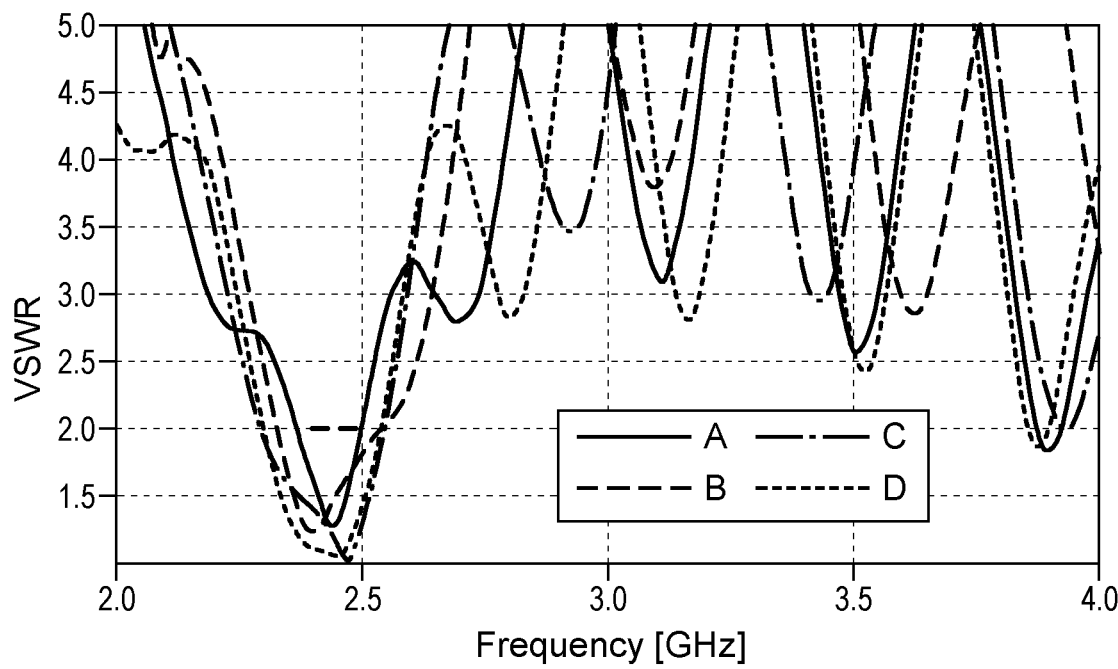
Figure 6B:
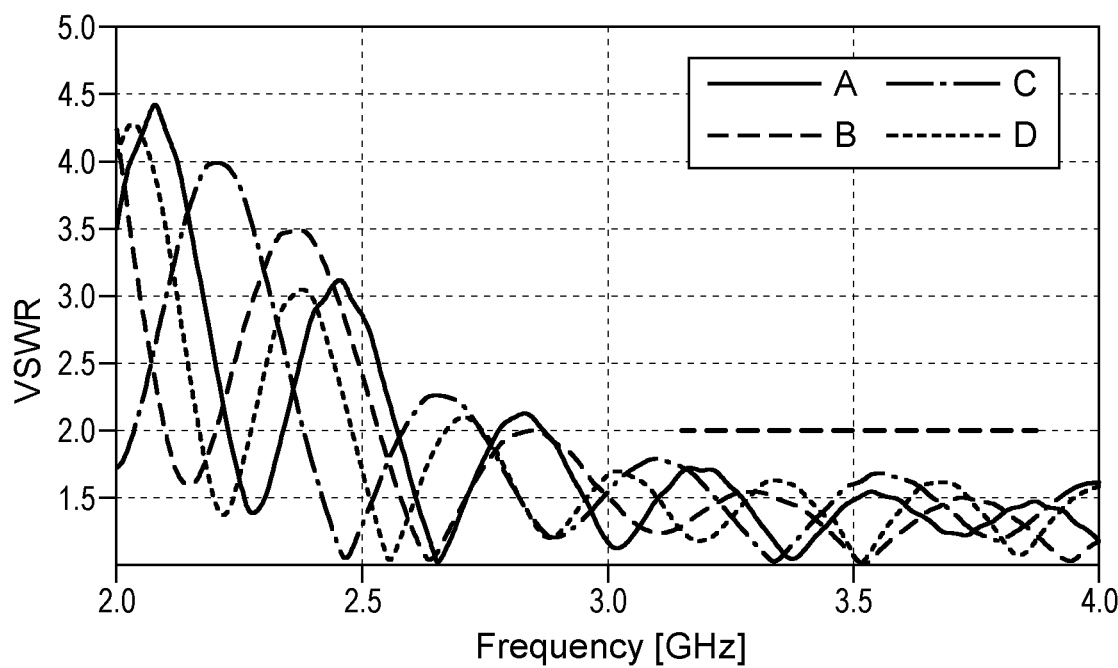

FIGS. 6*a* and 6*b* show a graph of the Voltage Standing Wave Ratio (VSWR) in relation to the frequency in GHz. A parameter requirement is that the VSWR is below 2:1. The measurements are carried out for four first antennas (A-D) used in an antenna system according to the present invention, which is shown in the previous figures. It can be seen that both for the 2.4 GHz frequency band (FIG. 6*a*) and the 5 GHz frequency band (FIG. 6*b*) the results are below the requirement which is indicated with the dotted line. The tests are performed by using a Vector Network Analyser in the 2.4 and 5 GHz operational frequency ranges.

Figure 7A:
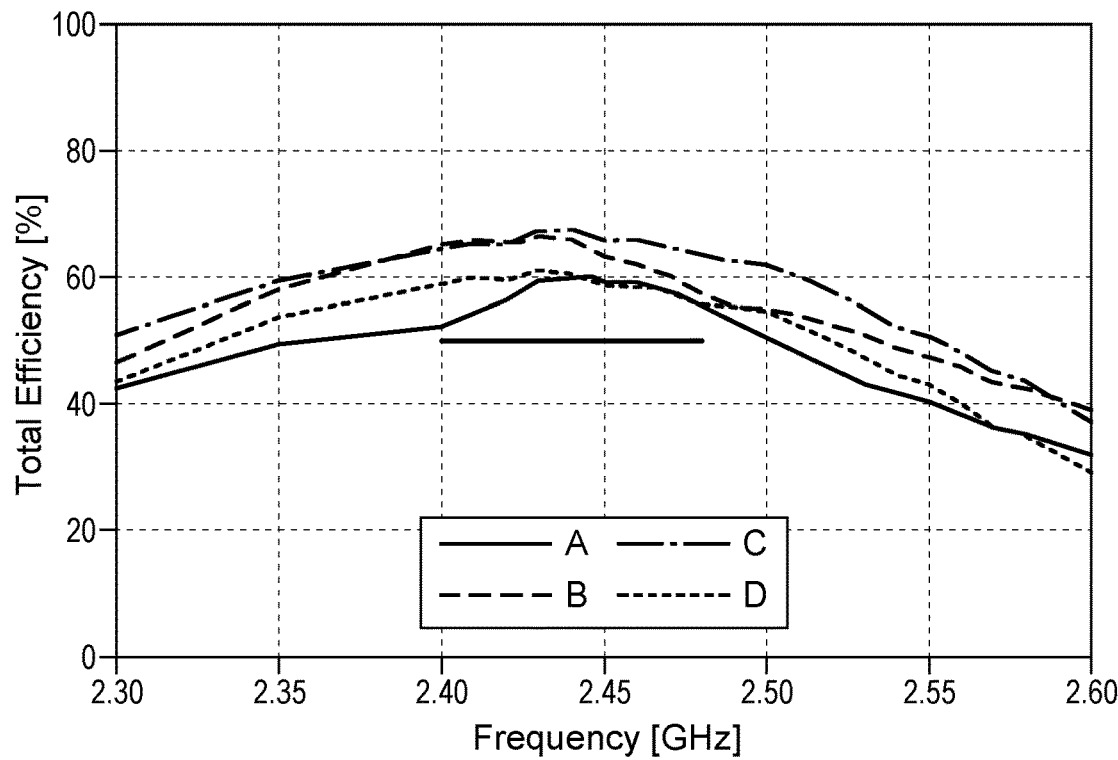
Figure 7B:
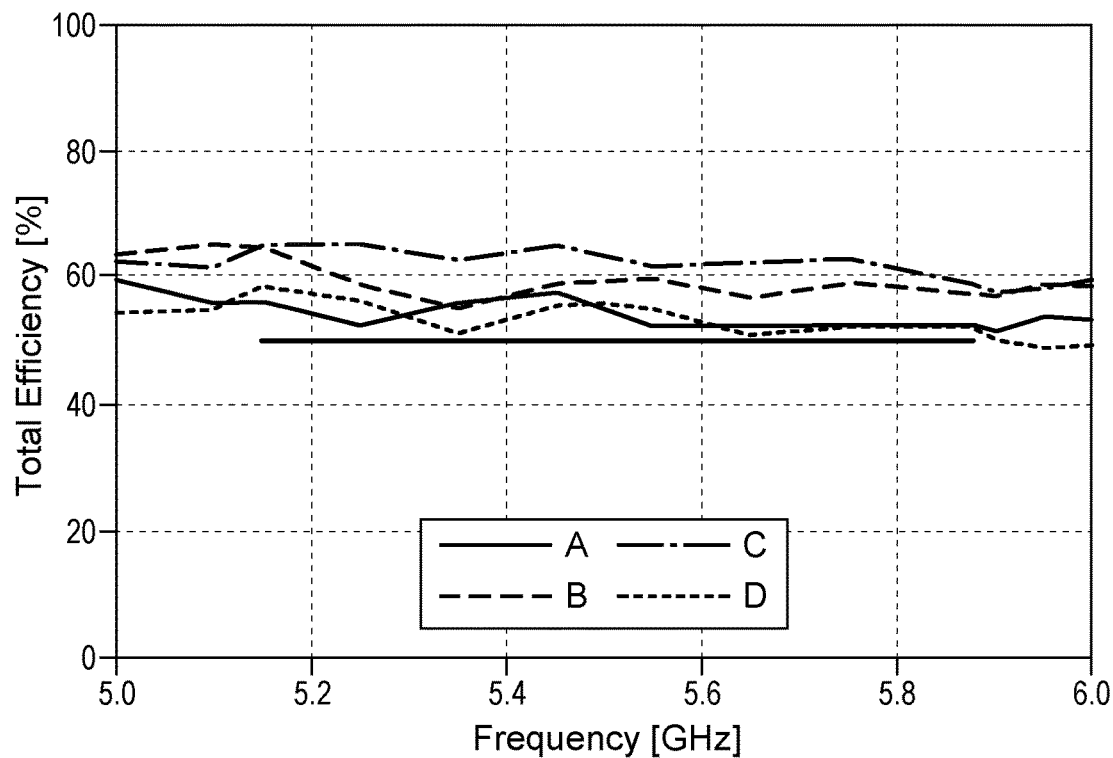

FIGS. 7*a* and 7*b* show a graph of the total efficiency (in %) for the used frequency bands. The uninterrupted line indicates the minimum efficiency requirement, which should be above 50% for both the 2.4 GHz and 5 GHz frequency bands. It can be observed that the total efficiency of all first antennas used in the antenna system fulfils the requirement for both frequency bands.

Figure 8A:
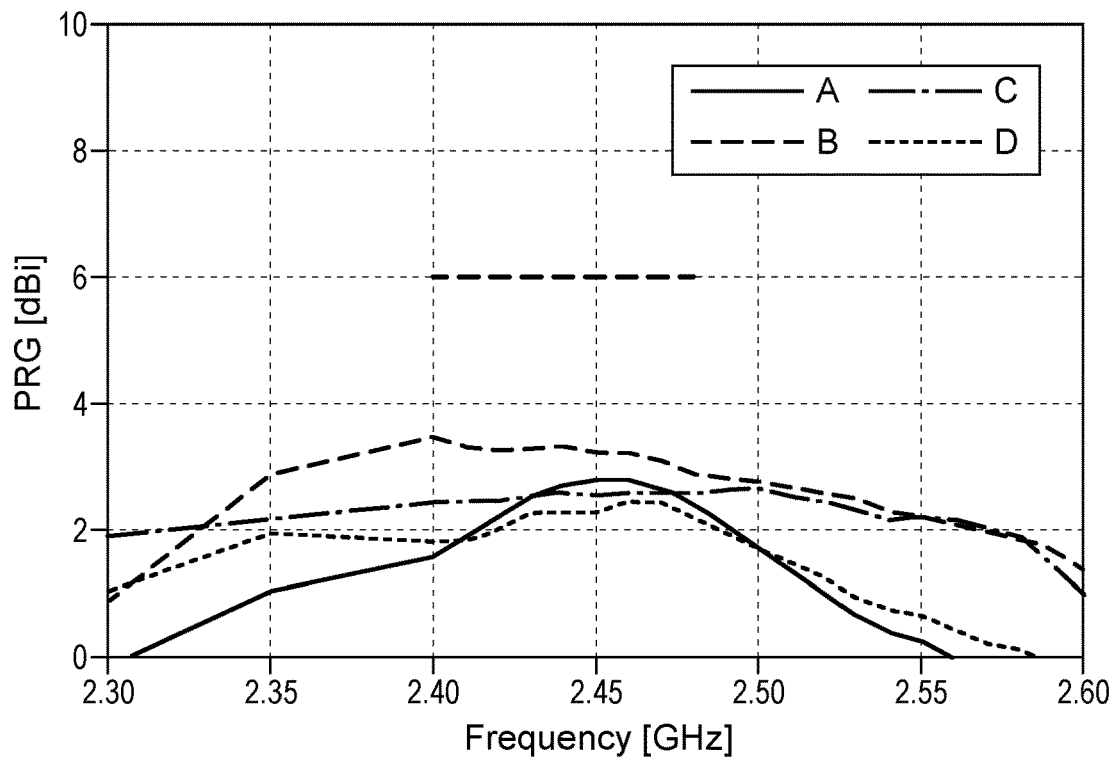
Figure 8B:
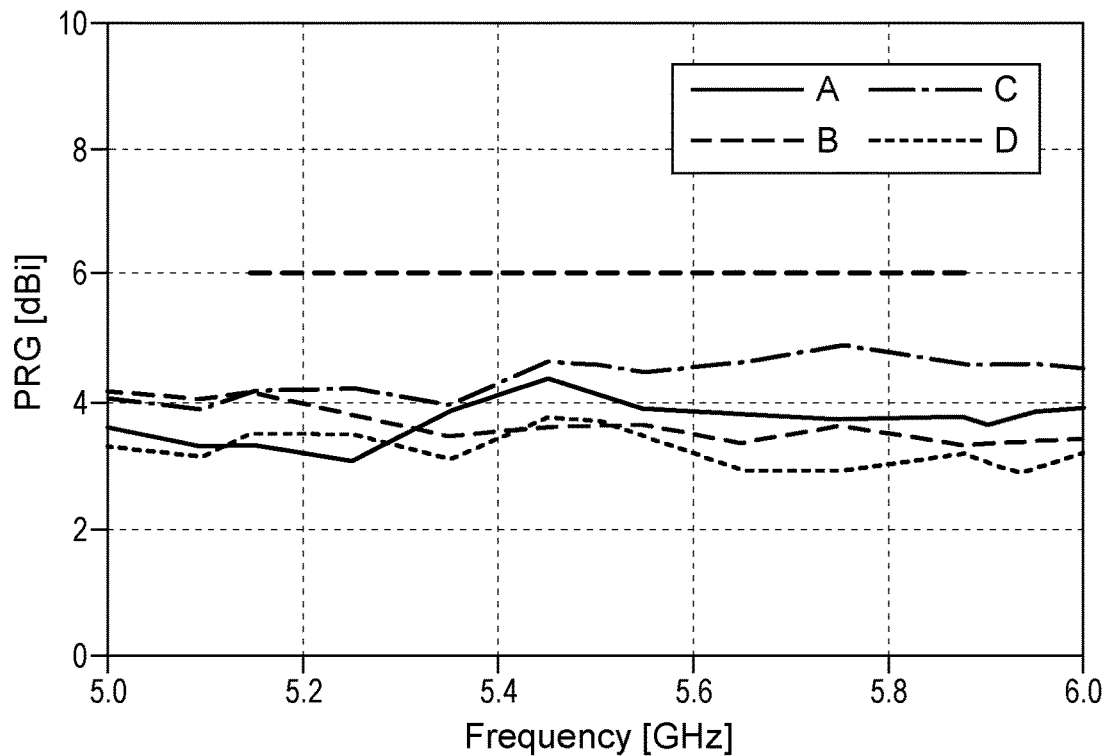

FIGS. 8*a* and 8*b* show a graph of the peak realized gain level (PRG) for both the 2.4 GHz frequency band (FIG. 8*a*) and the 5 GHz frequency band (FIG. 8*b*). It can be seen that for the low frequency band values ranging from 1.7 dBi to 3.7 dBi are measured, and that for the high frequency band values ranging from 3.5 dBi to 5.0 dBi are measured. These values are below the maximal level of 6.0 dBi specified by Federal Communications Commission (FCC) regulation.

Figure 9A:
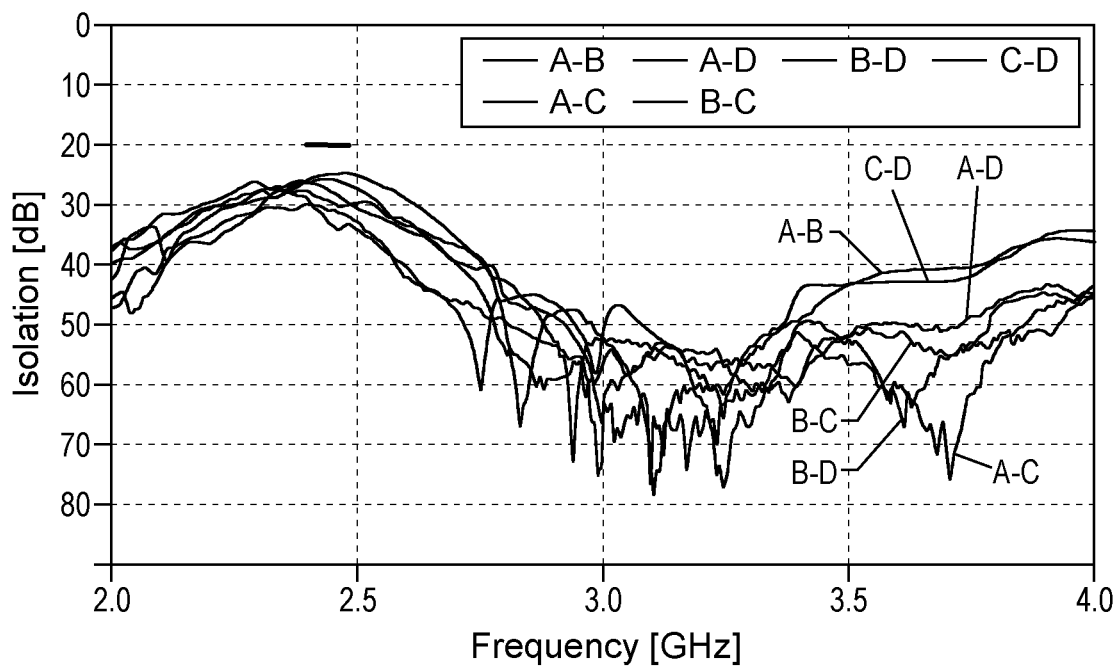
Figure 9B:
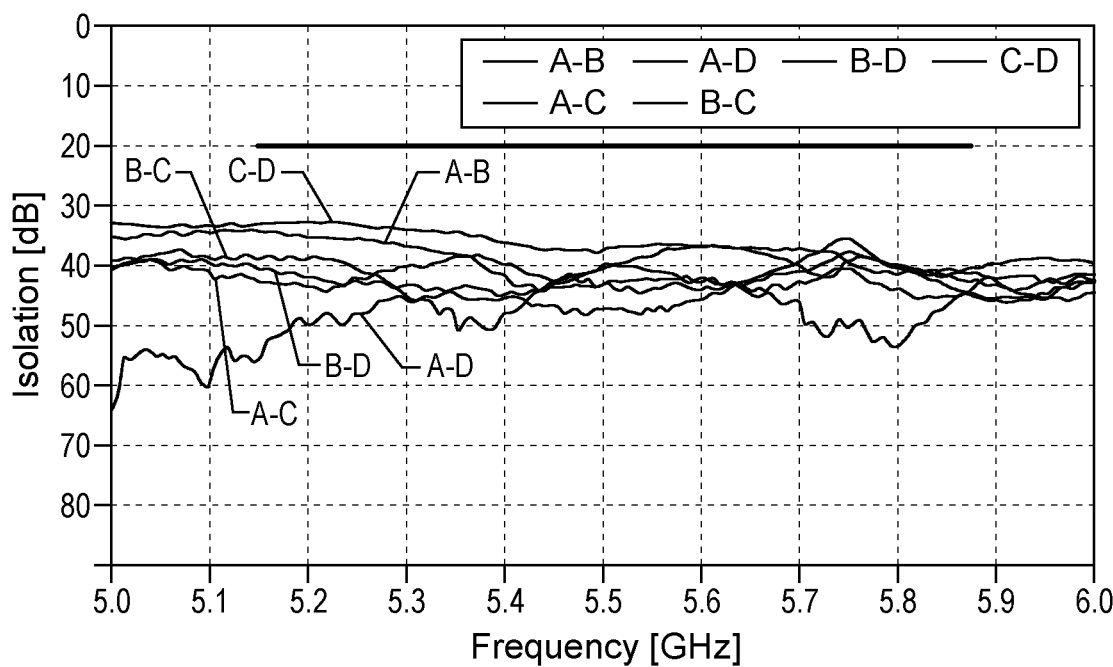

FIGS. 9*a* and 9*b* show a graph of the parasitic mutual coupling level measured between the dual band antennas A-D in said frequency ranges. The desired isolation value of above 20 dB is achieved for all antenna combinations.

FIGS. 10*a*-10*f* show the normalized radiation patterns for antennas A-D. It can be observed that the radiation patterns for the antennas substantially overlap for each measurement. Hence the radiation pattern can be qualified as quasi uniform, meaning that the antenna system according to the present invention provides uniform radio coverage without radiation nulls and/or blind spots for both the 2.4 and 5 GHz frequency band. This is supported by the results of the normalized aggregated radiation patterns for antennas A-D as shown in FIGS. 11*a*-11*f*.

FIGS. 12-17*c* are related to the second antennas E-H as shown in the previous figures. If a dotted line is indicated in the figure, the measured value should be below this threshold line. If an uninterrupted line is shown, the measured value should be above this threshold line.

Figure 12:
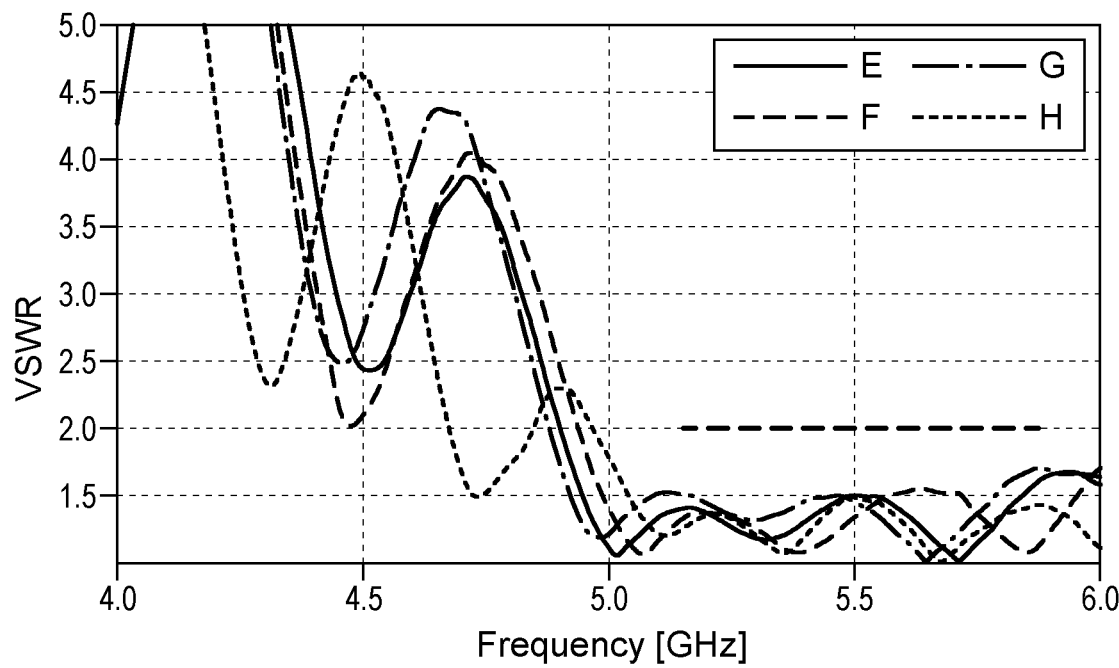

FIG. 12 shows a graph of the Voltage Standing Wave Ratio (VSWR) in relation to the frequency in GHz. A parameter requirement is that the VSWR is below 2:1. The measurements are done for four second antennas (E-H) used in an antenna system according to the present invention, which is shown in the previous figures. It can be seen that the result measured for the 5 GHz frequency band are below the requirement which is indicated with the dotted line.

Figure 13:
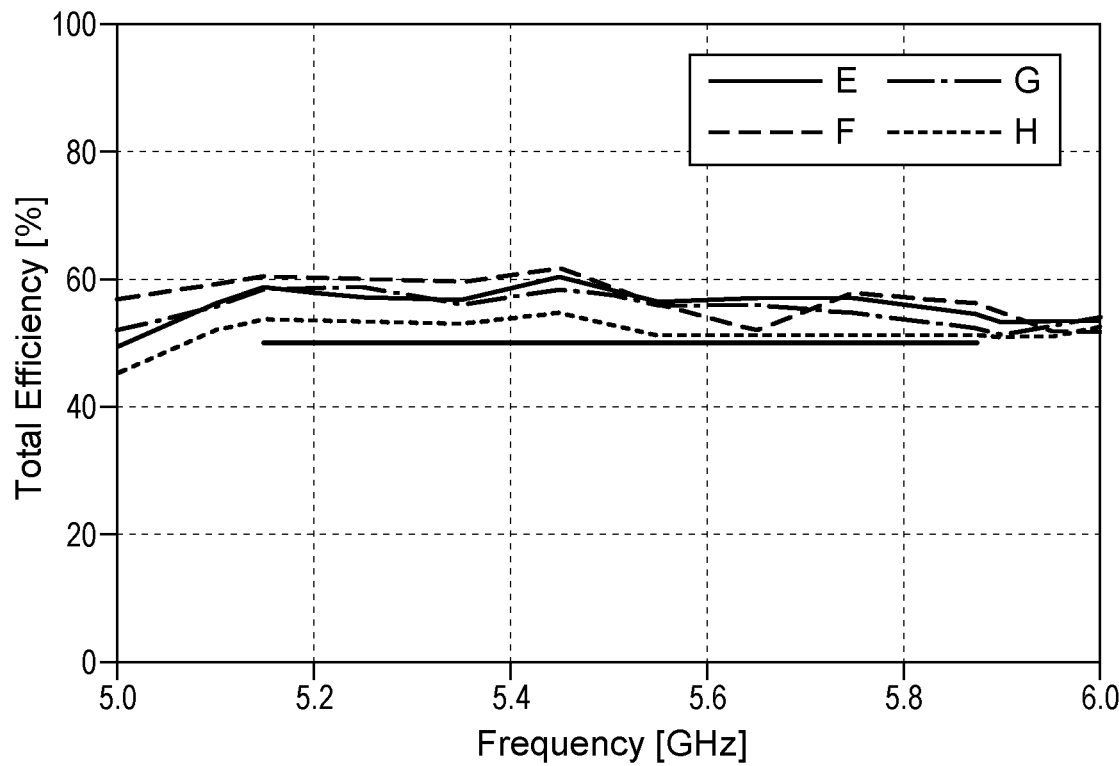

FIG. 13 shows a graph of the total efficiency (in %) for the 5 GHz frequency band, which meets the requirements indicated with the uninterrupted line for all antennas E-H.

Figure 14:
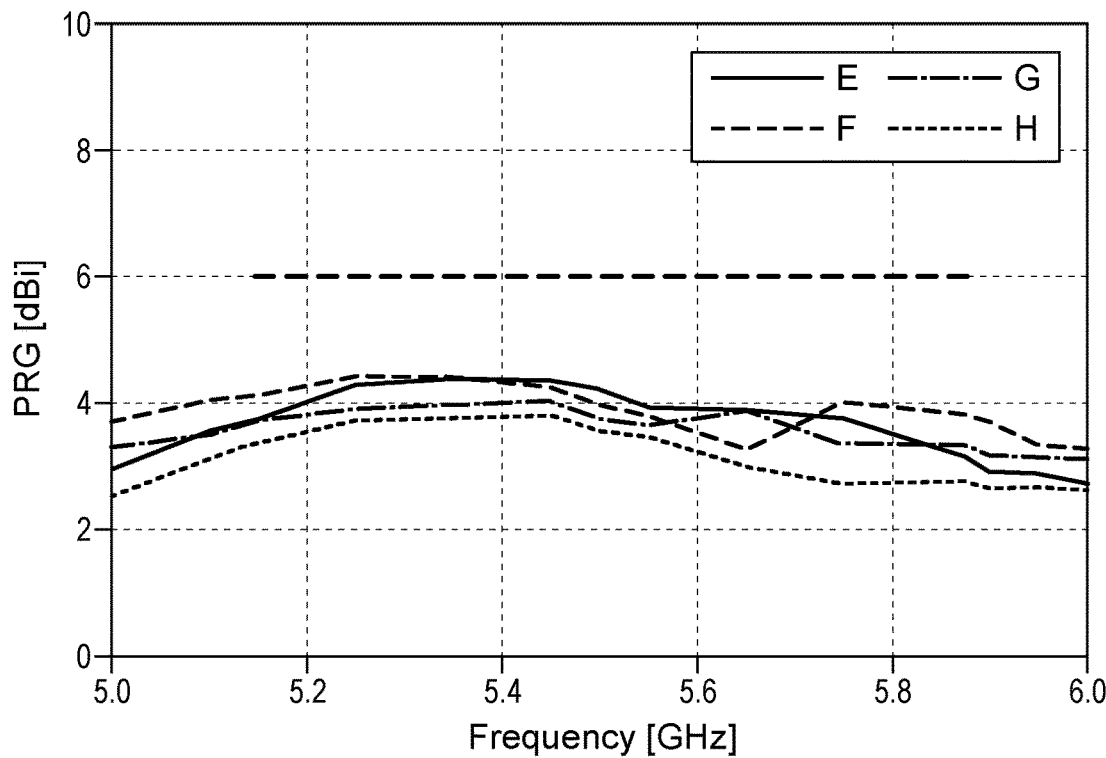

FIG. 14 shows a graph of the peak realized gain level (PRG) for the 5 GHz frequency band. It can be seen that the for this frequency band values ranging from 2.9 dBi to 4.6 dBi are measured. These values are below the maximal level of 6.0 dBi specified by Federal Communications Commission (FCC) regulation.

Figure 15:
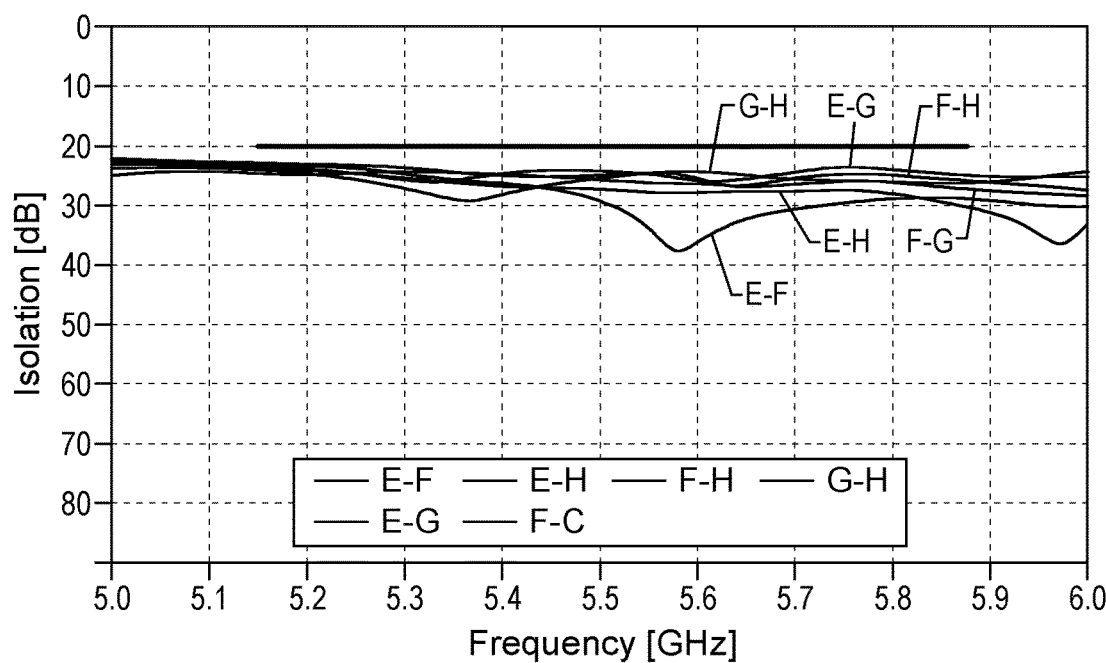

FIG. 15 shows the isolation between single-band 5 GHz antennas in the second MIMO pair. A graph of the parasitic mutual coupling level measured between the single-band antennas E-H is shown. The desired isolation value of above 20 dB is achieved for all antenna combinations.

Figure 17A:
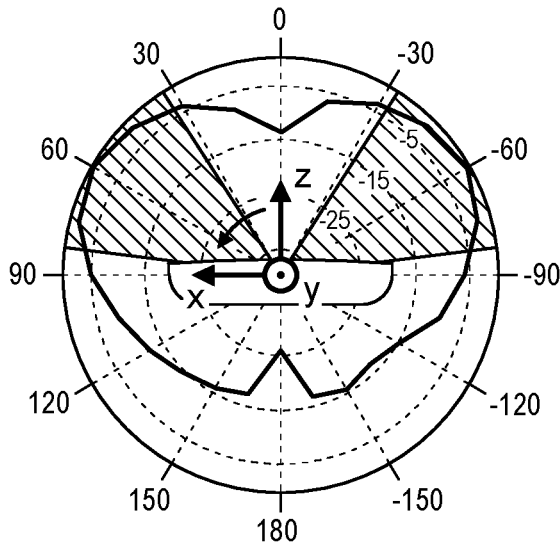
Figure 17B:
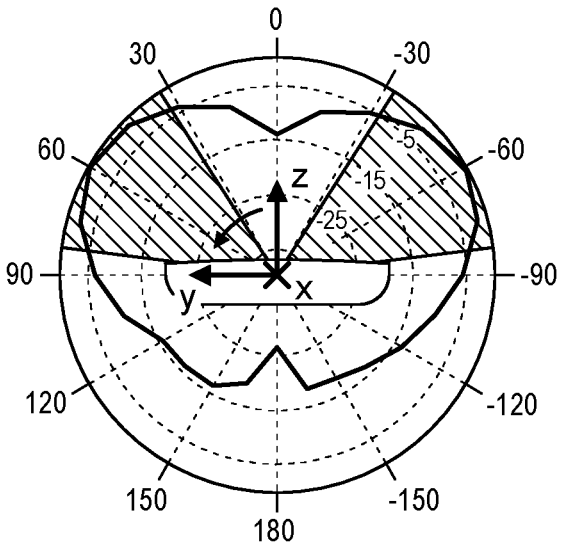
Figure 17C:
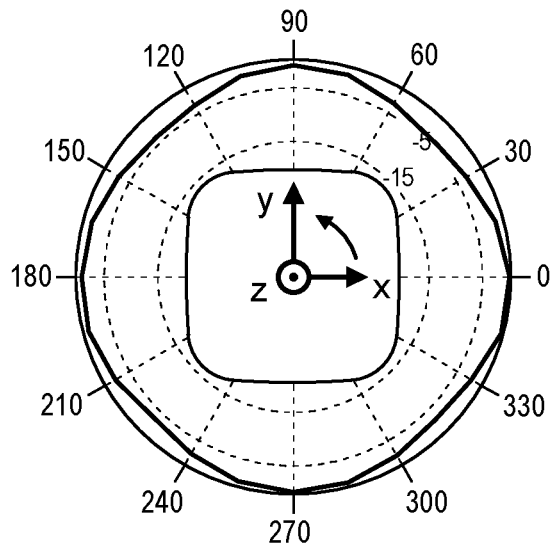

FIGS. 16a-16c show the normalized radiation patterns for antennas E-H. It can be observed that the radiation patterns for the antennas substantially overlap for each measurement. Hence the radiation pattern can be qualified as quasi uniform, meaning that the antenna system according to the present invention provides uniform radio coverage without radiation nulls and/or blind spots for the 5 GHz frequency band. This is supported by the results of the normalized aggregated radiation patterns for antennas E-H as shown in FIGS. 17a-17c.

Figure 18:
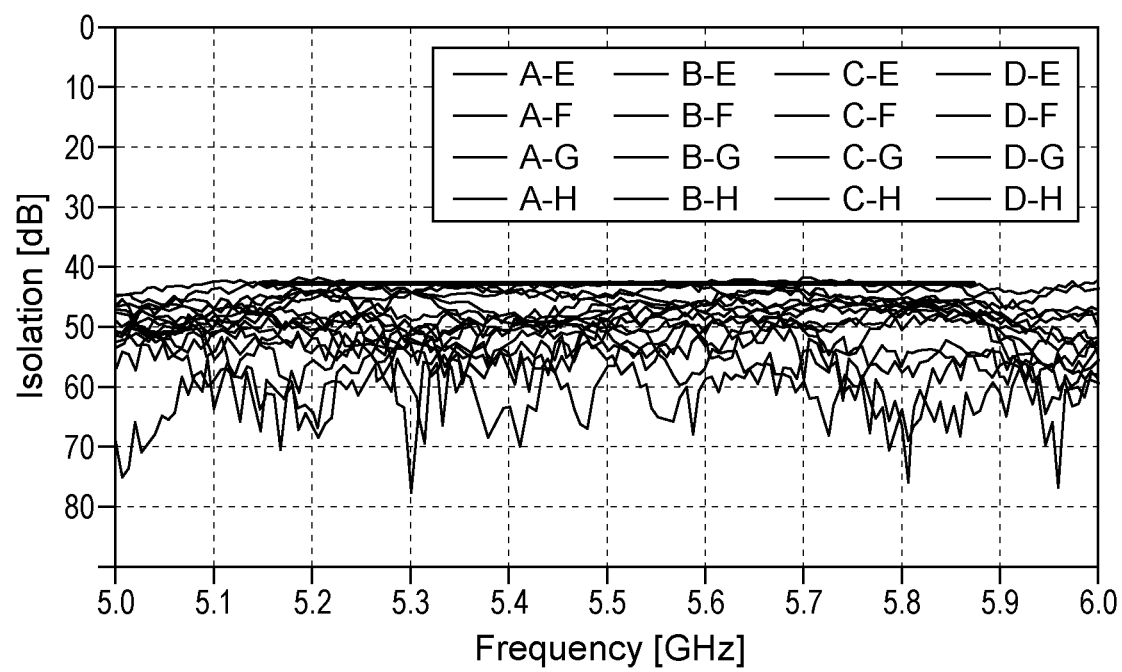

FIG. 18 shows the isolation between the first MIMO pair and the second MIMO pair. A graph of the parasitic mutual coupling level measured between dual-band antennas A-D and single-band antennas E-H is shown. The desired isolation value of above 43 dB is achieved for all antenna combinations in the 5 GHz frequency band.

FIGS. 19a-23f are related to the auxiliary antenna (106) as shown in FIGS. 1 and 2 and all antennas A-H. If a dotted line is indicated in the figure, the measured value should be below this threshold line. If an uninterrupted line is shown, the measured value should be above this threshold line.

Figure 19A:
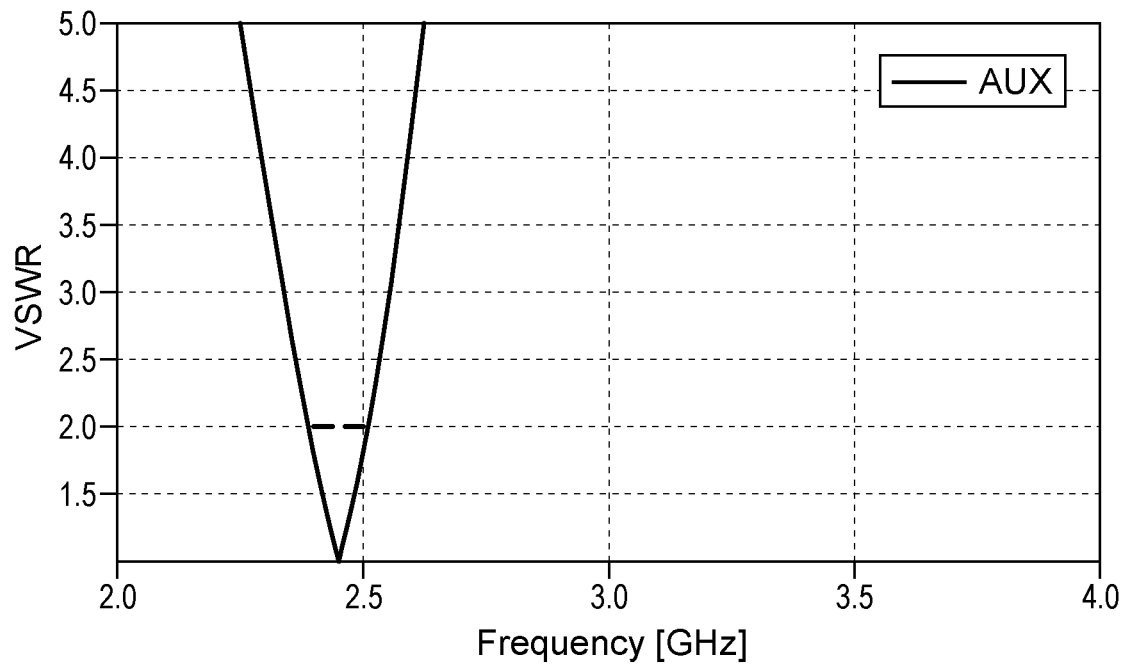
Figure 19B:
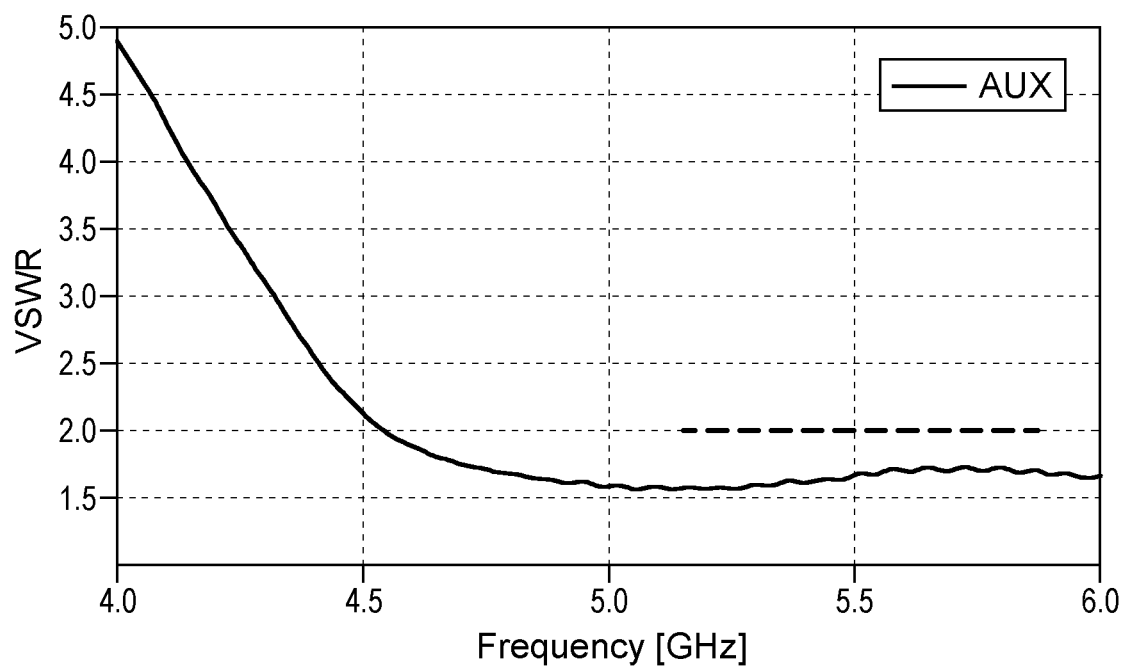

FIGS. 19a and 19b show a graph of the Voltage Standing Wave Ratio (VSWR) in relation to the frequency in GHz. A parameter requirement is that the VSWR is below 2:1. It can be seen that both for the 2.4 GHz frequency band (FIG. 19a) and the 5 GHz frequency band (FIG. 19b) the results are below the requirement which is indicated with the dotted line.

Figure 20A:
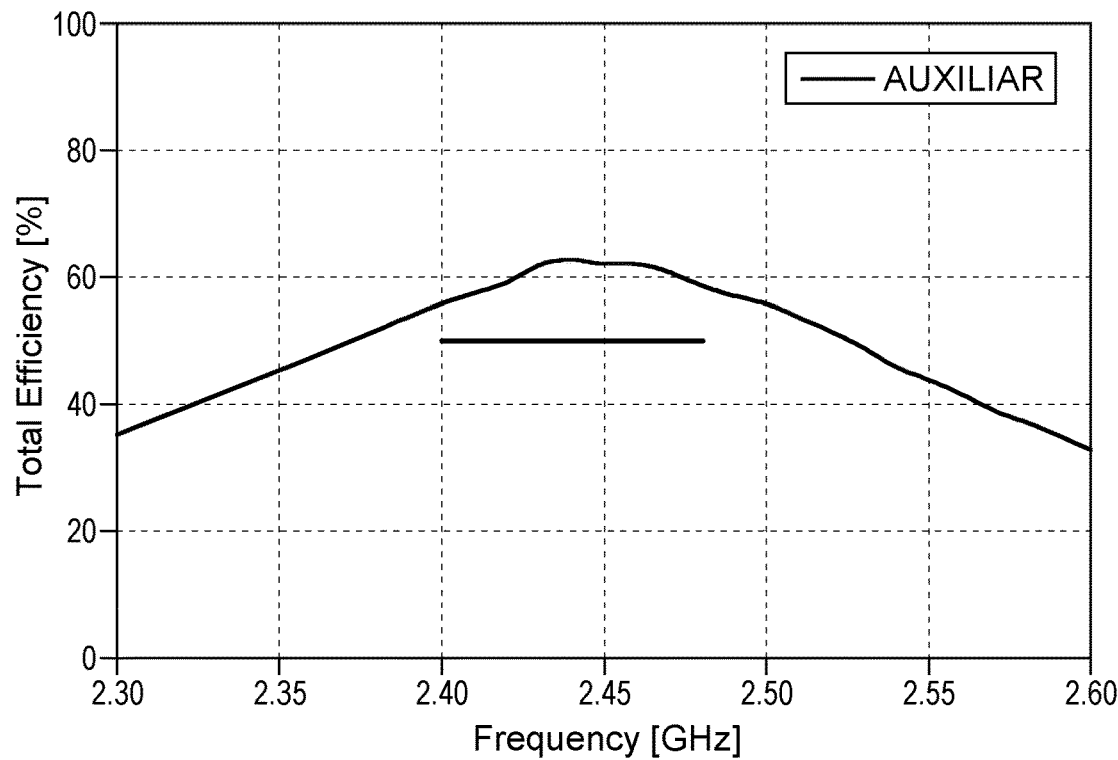
Figure 20B:
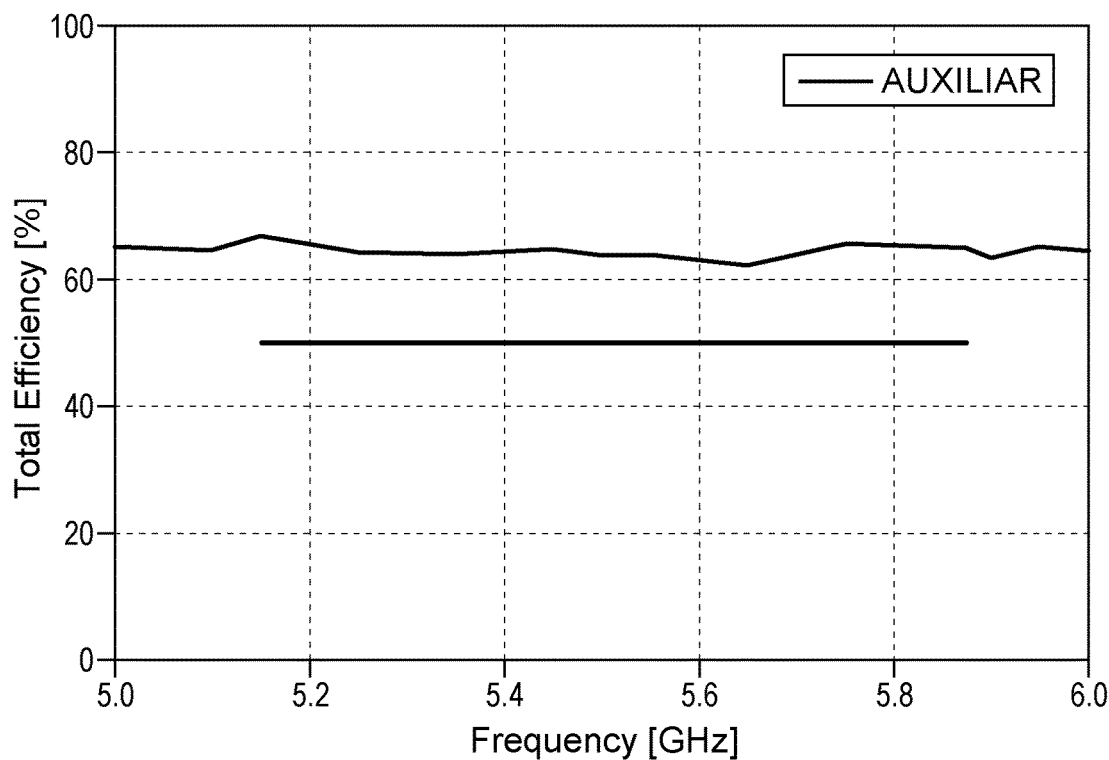

FIGS. 20a and 20b show a graph of the total efficiency (in %) for the used frequency bands. The uninterrupted line indicates the minimum efficiency requirement, which should be above 52.5% for the 2.4 GHz frequency band and above 50% for the 5 GHz frequency band. It can be observed that the total efficiency fulfils the requirement for both frequency bands for the auxiliary antenna (106).

Figure 21A:
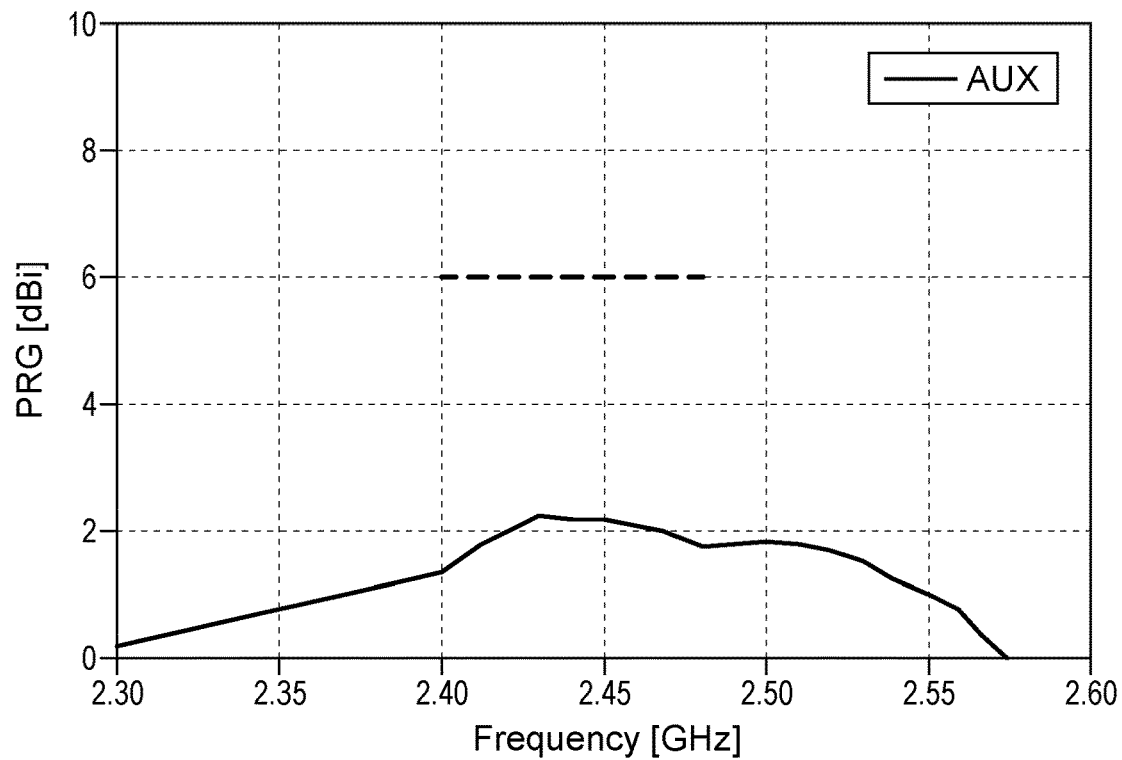
Figure 21B:
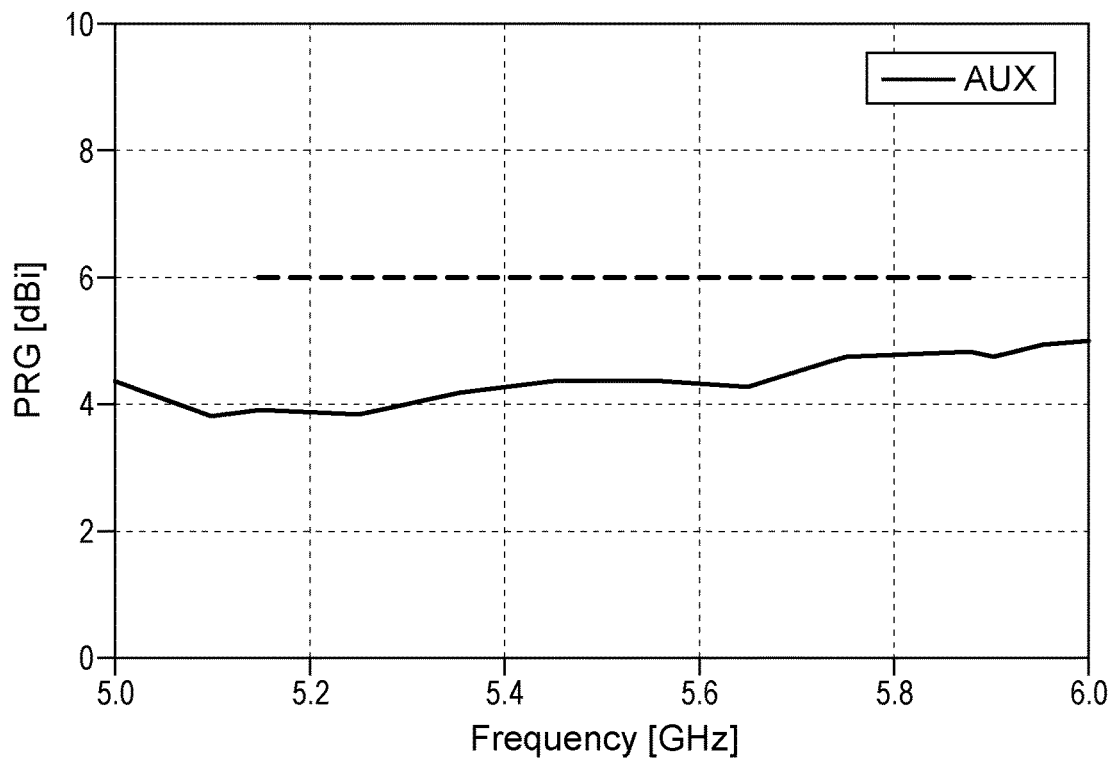

FIGS. 21a and 21b show a graph of the peak realized gain level (PRG) for both the 2.4 GHz frequency band (FIG. 21a) and the 5 GHz frequency band (FIG. 21b). It can be seen that the for the low frequency band values of between 1.7 dBi to 2.1 dBi are measured, and that for the high frequency band values ranging from 3.9 dBi to 5.0 dBi are measured. These values are sufficiently below the maximal level of 6.0 dBi specified by Federal Communications Commission (FCC) regulation.

Figure 22A:
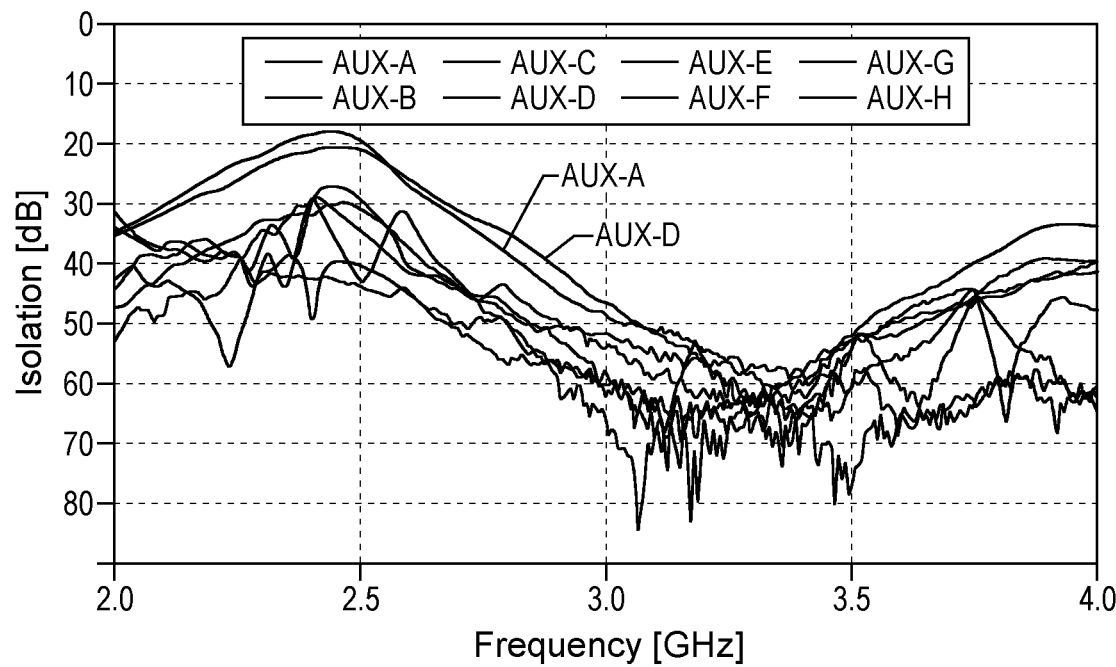
Figure 22B:
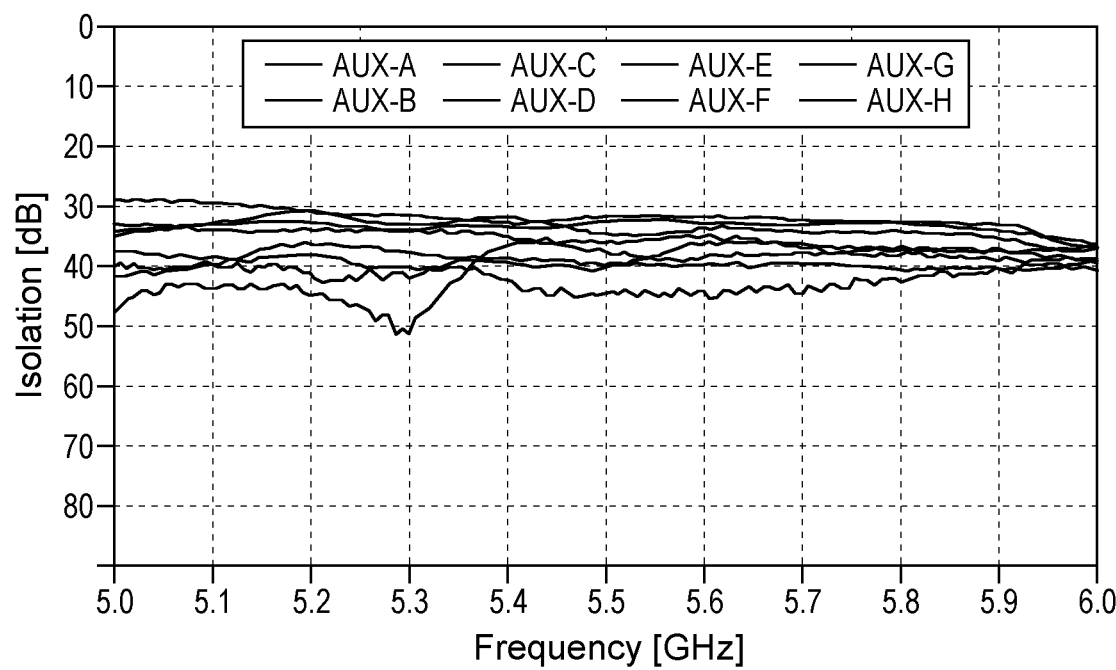
Figure 23A:
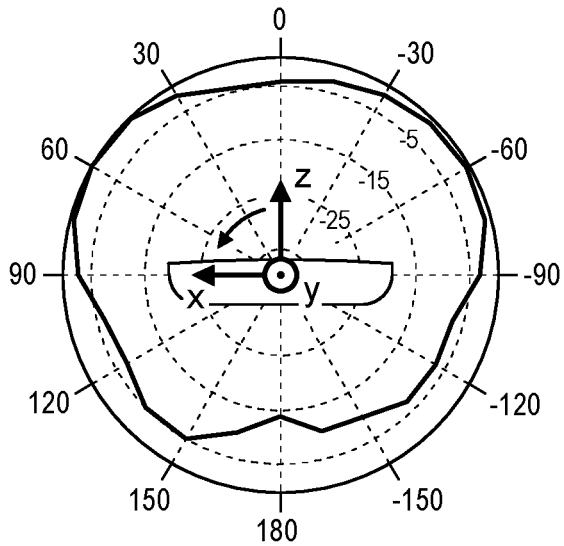
Figure 23B:
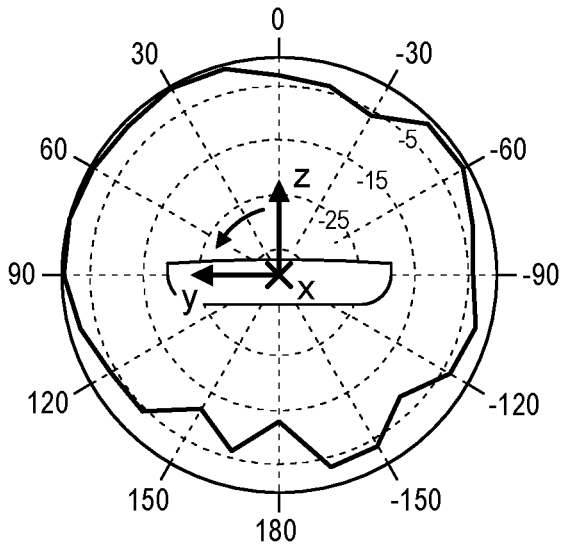
Figure 23C:
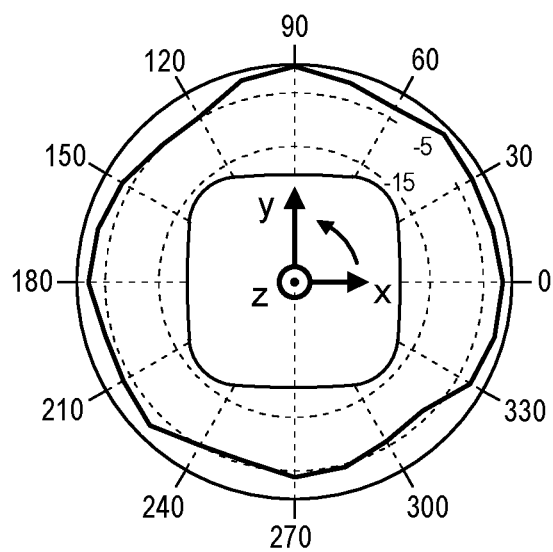
Figure 23D:
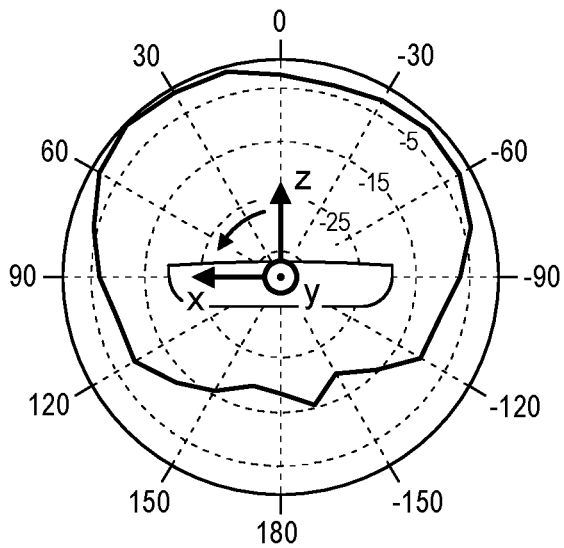
Figure 23E:
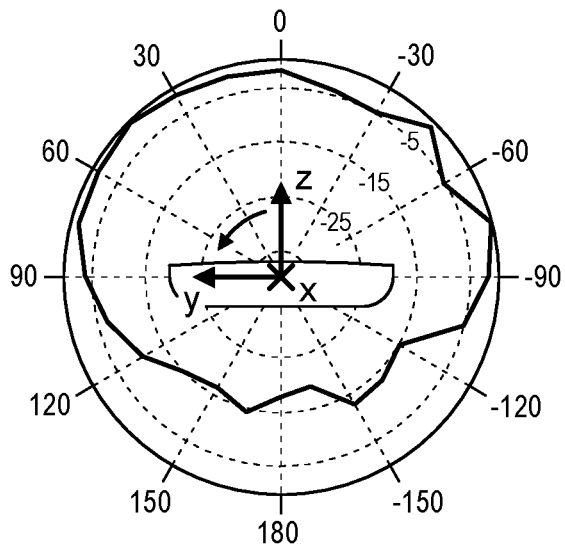
Figure 23F:
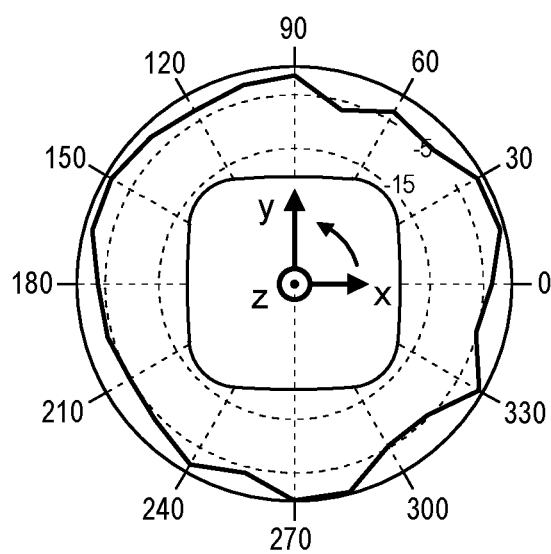

FIGS. 22a and 22b show a graph of the parasitic mutual coupling level measured between the auxiliary antenna and antennas A-H in said frequency ranges. The desired isolation value of above 15 dB is achieved for all antenna combinations in the 2.4 GHz frequency band. The desired isolation value of above 20 dB is achieved for all antenna combinations for the 5 GHz frequency band.

FIGS. 23a-23f show the normalized radiation patterns for the auxiliary antenna.

FIGS. 24-28c are related to the auxiliary vertically polarized single-band BLE antenna (107) mounted onto the ground plane as shown in FIGS. 1 and 2 and all antennas A-H. If a dotted line is indicated in the figure, the measured value should be below this threshold line. If an uninterrupted line is shown, the measured value should be above this threshold line.

Figure 24:
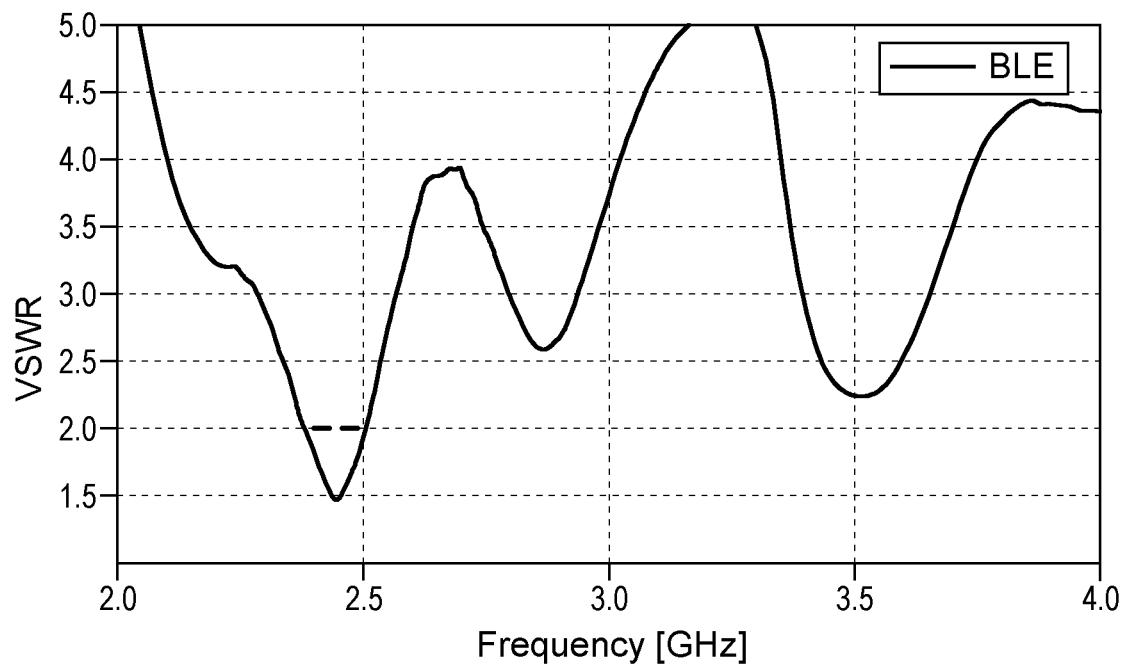

FIG. 24 shows a graph of the Voltage Standing Wave Ratio (VSWR) in relation to the frequency in GHz. A parameter requirement is that the VSWR is below 2:1. It can be seen that the result measured for the 2.4 GHz frequency band are below the requirement which is indicated with the dotted line.

Figure 25:
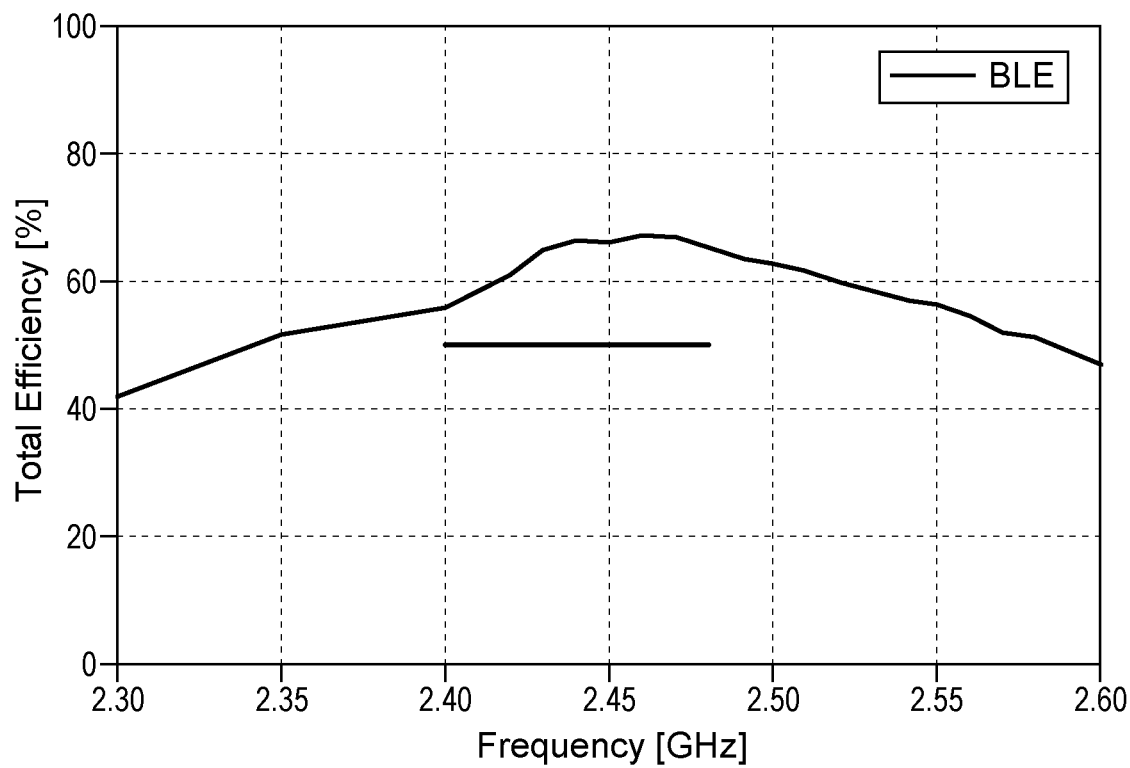

FIG. 25 shows a graph of the total efficiency (in %) for the 2.4 GHz frequency band, which meets the requirements indicated with the uninterrupted line.

Figure 26:
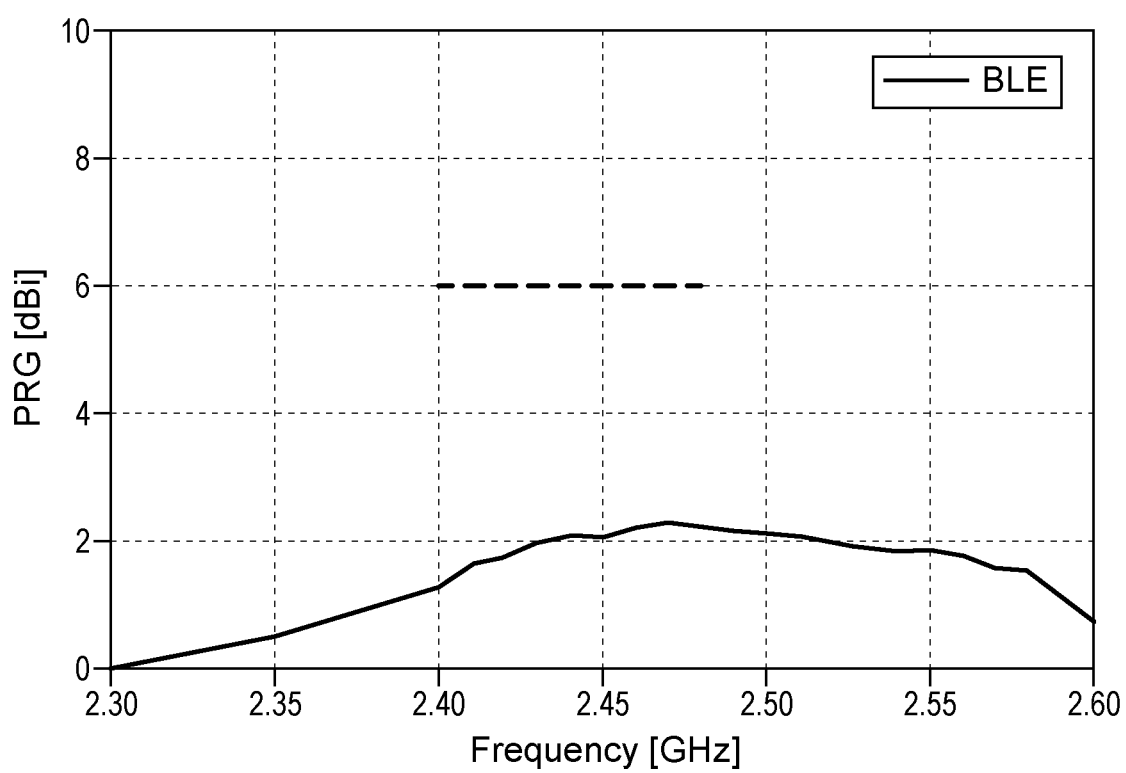

FIG. 26 shows a graph of the peak realized gain level (PRG) for the 2.4 GHz frequency band. It can be seen that the for this frequency band values ranging from 1.6 dBi to 2.1 dBi are measured. These values are sufficiently below the maximal level of 6.0 dBi specified by Federal Communications Commission (FCC) regulation.

Figure 27A:
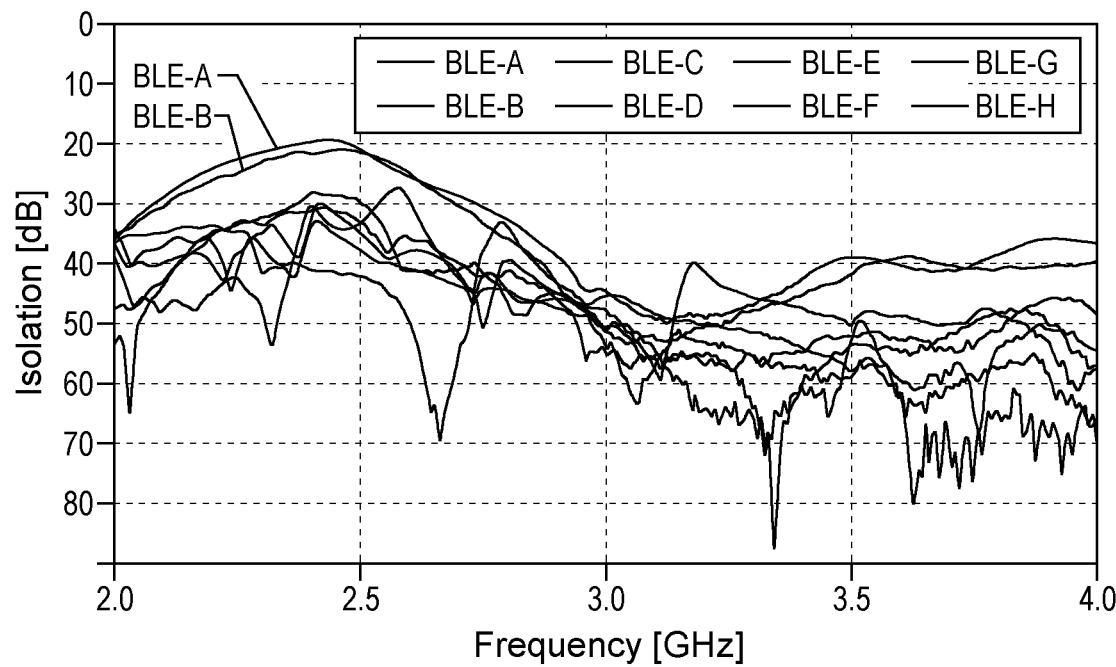
Figure 27B:
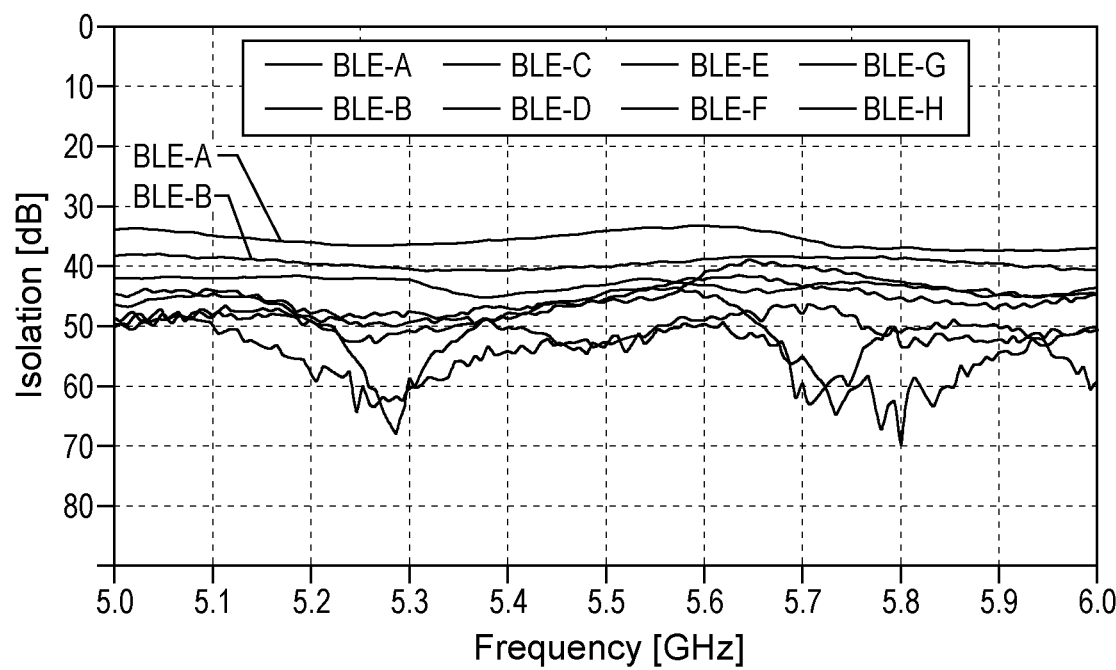

FIGS. 27a and 27b show a graph of the parasitic mutual coupling level measured between the BLE antenna and antennas A-H in the 2.4 and 5 GHz frequency ranges. The desired isolation value of above 15 dB is achieved for all antenna combinations in the 2.4 GHz frequency band. The desired isolation value of above dB is achieved for all antenna combinations for the 5 GHz frequency band.

Figure 28A:
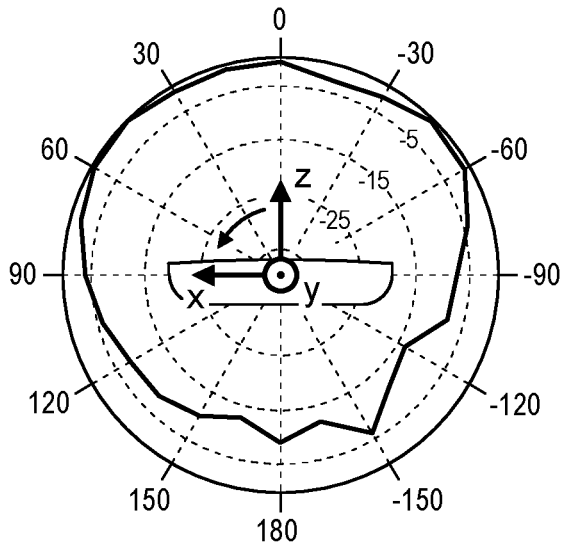
Figure 28B:
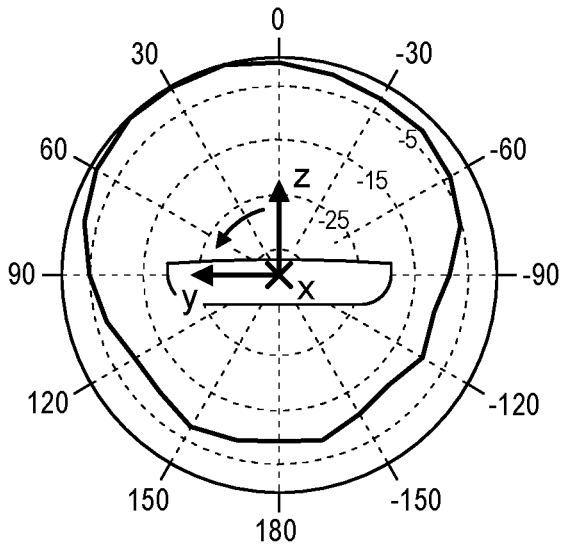
Figure 28C:
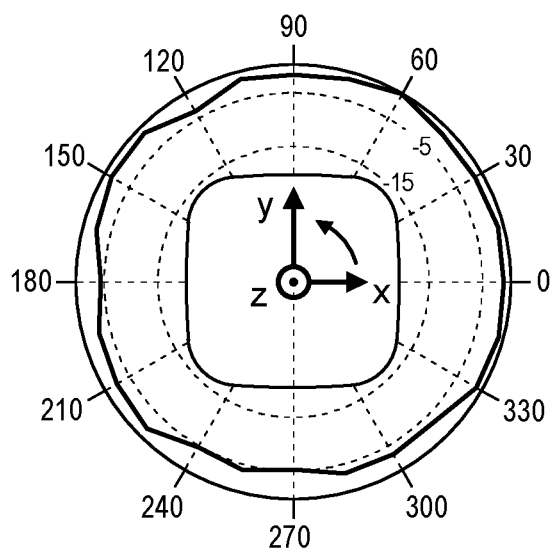
Figure 29A:
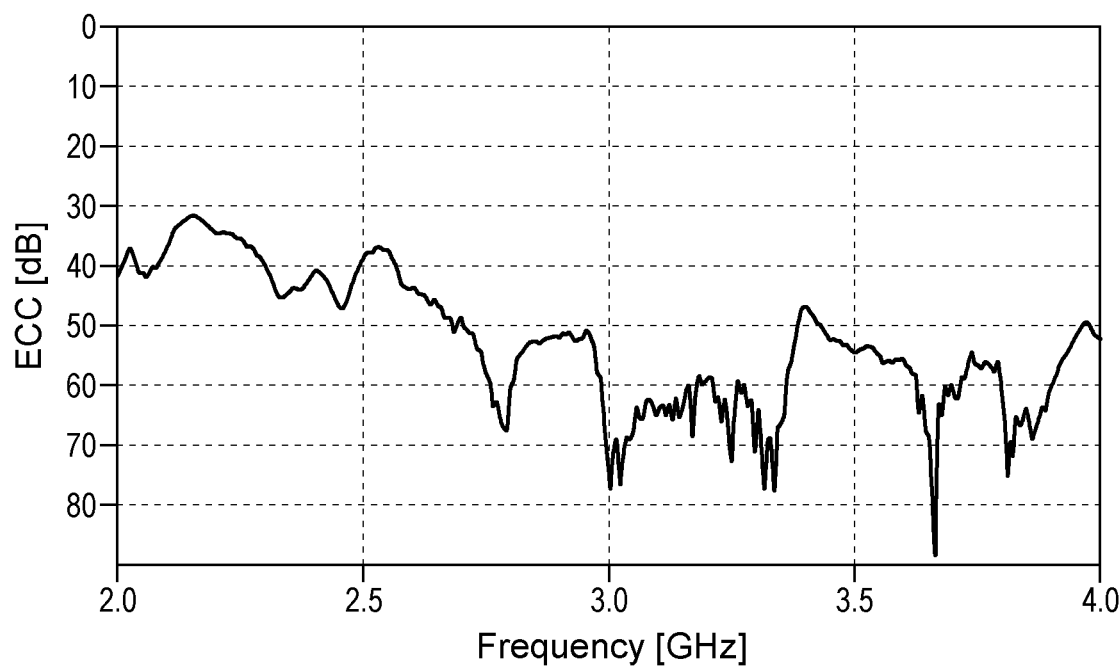
Figure 29B:
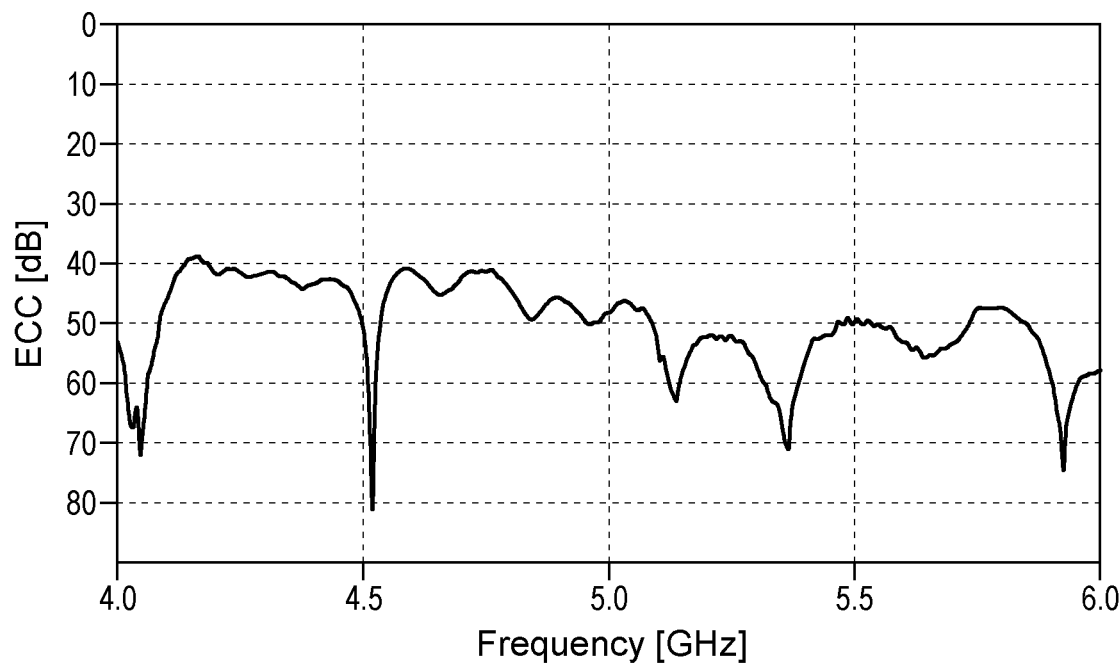
Figure 30A:
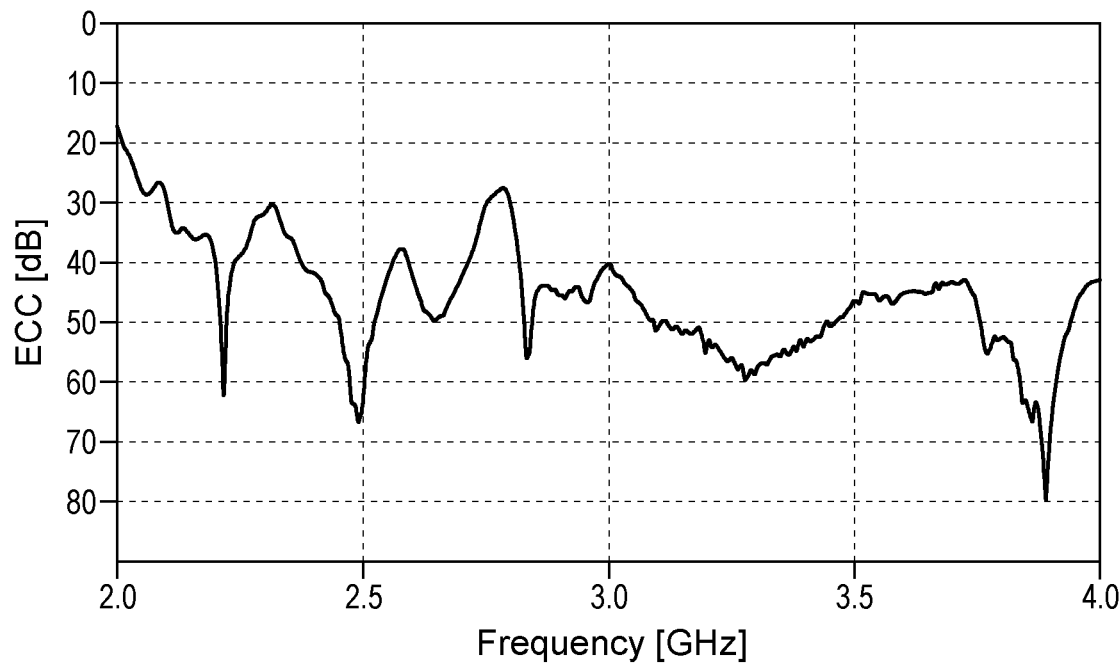
Figure 30B:
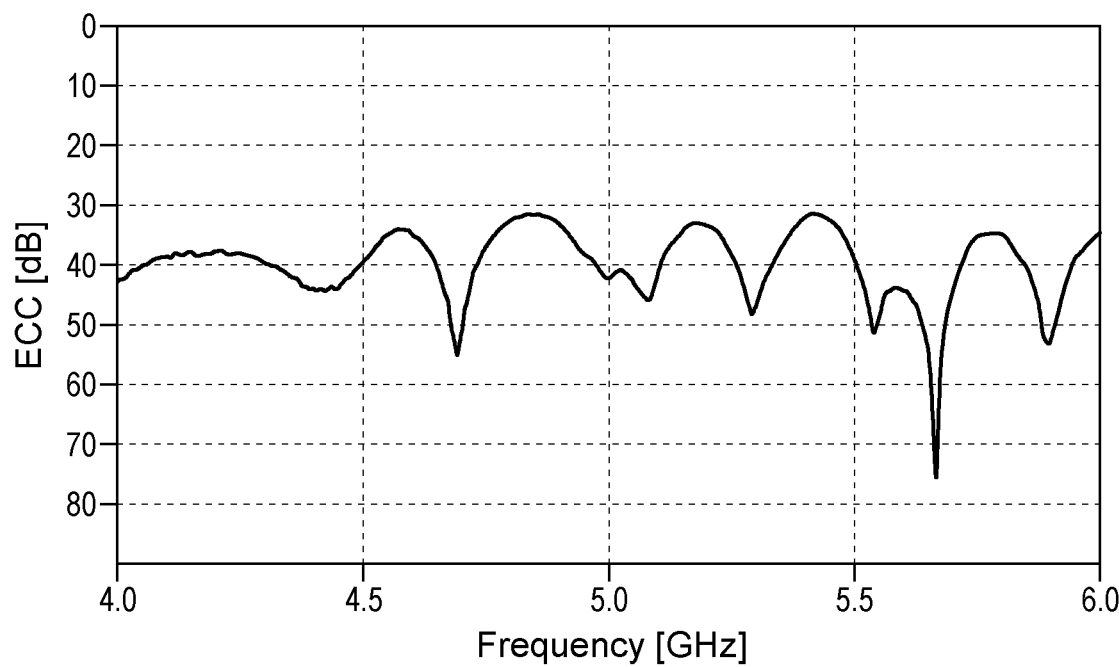
Figure 31A:
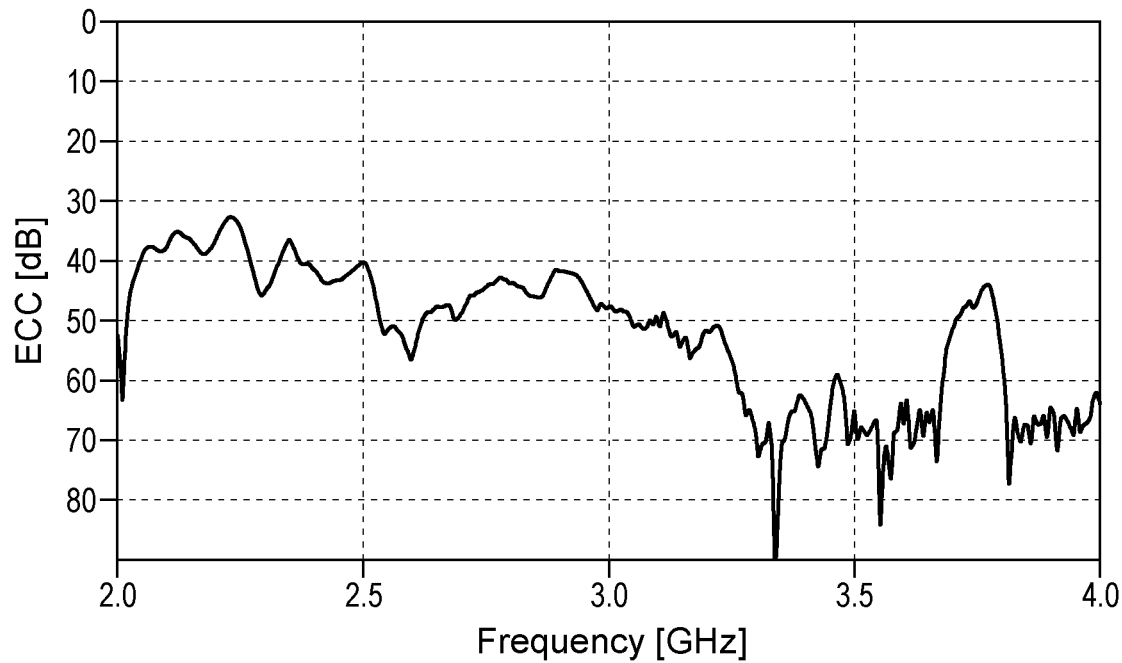
Figure 31B:
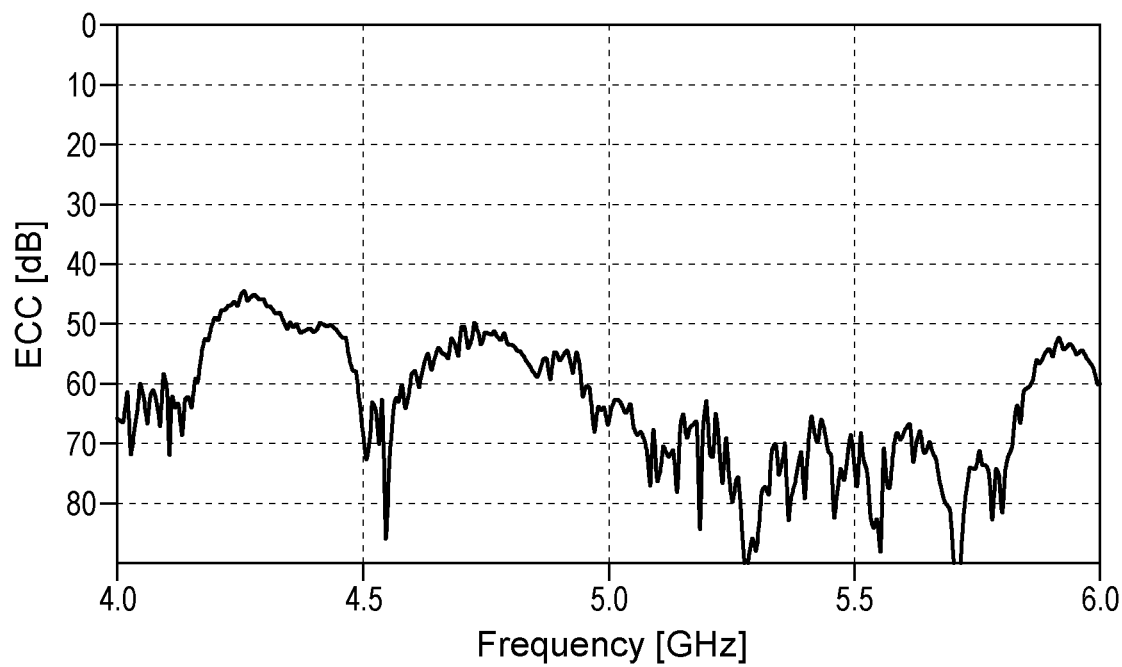

FIGS. 28a-28c show the normalized radiation patterns for the auxiliary antenna. FIGS. 29a-31b show the results of the simulated antenna system performance. FIGS. 29a and 29b show the antenna Envelope Correlation Coefficients (ECC). The ECC value is a measure for the independency of two antennas' radiation patterns. A sufficiently good ECC is achieved in the 2.4 GHz and 5.0 GHz frequency bands between all the antenna elements in the first MIMO pair. FIGS. 30a and 30b show the ECC values for the antenna elements in the second MIMO pair, which have an improved performance when compared to the results of FIGS. 29a and 29b. FIGS. 31a and 31b show the ECC values between the first and the second MIMO pairs being even better.

It will be apparent that the invention is not limited to the working examples shown and described herein, but that numerous variants are possible within the scope of the attached claims that will be obvious to a person skilled in the art.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

The ordinal numbers used in this document, like "first", and "second", are used only for identification purposes. Expressions like "horizontal", and "vertical", are relative expressions with respect to a plane defined by the ground plane. The verb "comprise" and conjugations thereof used in this patent publication are understood to mean not only "comprise", but are also understood to mean the phrases "contain", "substantially consist of", "formed by" and conjugations thereof.

The invention claimed is:

1. Multiple-Input, Multiple-Output ("MIMO") antenna system for IEEE 802.11 WiFi communication, comprising:
    a conductive ground plane,
    a first MIMO pair of mutually spaced vertically polarized first antennas, mounted onto a top surface of said ground plane, and configured to operate in the 5 GHz frequency band and/or the 2.4 GHz frequency band, and
    a second MIMO pair of mutually spaced horizontally polarized second antennas mounted on the top surface of said ground plane, and configured to operate in the 5 GHz frequency band and the 2.4 GHz frequency band, a plurality of first feeding cables, wherein each first feeding cable is connected to a first antenna, a plurality of second feeding cables, wherein each second feeding cable is connected to a second antenna, wherein the ground plane is provided with a plurality of cable channels, wherein each cable channel is configured to accommodate at least a part of an individual feeding cable, wherein at least one plurality of the first feeding cables and at least one of the plurality of second feeding cables are accommodated in different cable channels, respectively, with each feeding cable being entirely in its own cable channel, and wherein each cable channel extends from an antenna and connects to a cable feed-through opening applied in the ground plane, wherein the first antennas of first MIMO pair entirely enclose the second antennas of the second MIMO pair.

2. Antenna system according to claim 1, wherein the cable channels comprise:

a plurality of first cable channels, wherein each first cable channel is provided with at least a part of at least one first feeding cable, and a plurality of second cable channels, wherein each second cable channel is provided with at least a part of at least one second feeding cable.

3. Antenna system according to claim 2, wherein at least two, and preferably all, first cable channels extend to a first cable feed-through opening applied in the ground plane.

4. Antenna system according to claim 2, wherein at least two, and preferably all, second cable channels extend to a second cable feed-through opening applied in the ground plane.

5. Antenna system according to claim 2, wherein the first cable channels are entirely separated from each other.

6. Antenna system according to claim 2, wherein the antennas of the first MIMO pair define a first simple polygon, wherein the cable feed-through opening applied in the ground plane connecting to a second cable is situated within said first simple polygon.

7. Antenna system according to claim 1, wherein the depth of at least one cable channel is substantially equal to or exceeds the diameter of the feeding cable accommodated within said cable channel.

8. Antenna system according to claim 1, wherein at least one cable channel is at least partially curved.

9. Antenna system according to claim 1, wherein at least one feeding cable is locked in place within a cable channel by the cable channel itself.

10. Antenna system according to claim 1, wherein at least one feeding cable is locked in place within a cable channel by using at least one adhesive strip covering the cable channel at least partially.

11. Antenna system according to claim 1, wherein each feeding cable is formed by a coax cable.

12. Antenna system according to claim 1, wherein at least two second antennas are positioned in the line of sight with each other, and wherein at least two first antennas are positioned in the line of sight with each other.

13. Antenna system according to claim 1, wherein the first antennas are configured to operate solely in the 5 GHz frequency band.

14. Antenna system according to claim 1, wherein the antenna system comprises at least one auxiliary vertically polarized dual-band antenna mounted onto the ground plane and/or wherein the antenna system comprises at least one auxiliary vertically polarized single-band antenna mounted onto the ground plane.

15. Antenna system according to claim 14, wherein said at least one auxiliary antenna is mounted onto the ground plane such that this auxiliary antenna interrupts the line of sight of two adjacent first antennas.

16. Antenna system according to claim 14, wherein the assembly of second antennas of the second MIMO pair encloses an accommodating space, wherein said at least one auxiliary antenna is at least partially positioned within said accommodating space.

17. Antenna system according to claim 14, wherein said at least one auxiliary antenna is a single-band Bluetooth antenna.

18. Antenna system according to claim 1, wherein the antenna system comprises at least one parasitic element, preferably formed by a metallic pin, mounted onto the top surface of the ground plane and positioned in between a first antenna and an adjacent second antenna.

19. Antenna system according to claim 1, wherein each second antenna comprises:

a substantially flat, dielectric substrate, a conductive central feeding point, at least three folded dipole elements applied onto an upper side of said substrate, each folded dipole element comprising:

a loop-shaped first conductor including a first curved inner conductor part and a first curved outer conductor part, wherein outer ends of the first inner conductor part are connected to respective outer ends of the first outer conductor part, and a first conductive dipole branch and a conductive second dipole branch, both dipole branches being connected, respectively, to different segments of said first inner conductor part, wherein both dipole branches are also connected to said central feeding point, wherein the conductors of the folded dipole elements are arranged in a substantially circular arrangement.

20. Wireless device, such as a wireless access points (AP), a router, a gateway, and/or a bridge, comprising at least one antenna system according to claim 1.

21. Wireless communication system, comprising a plurality of antennas systems according to claim 1.

22. Antenna system according to claim 1, wherein the antennas of the first MIMO pair together define a first simple polygon, and the antennas of the second MIMO pair together define a second simple polygon, wherein the second simple polygon is situated entirely within the first simple polygon without any intersecting or coinciding borders.

23. Antenna system according to claim 1, wherein adjacent first antennas are positioned in a line of sight with each other, which said line of sight is not obstructed by the second antennas.

* * * * *